(12) United States Patent
Eom et al.

(10) Patent No.: US 8,261,010 B2
(45) Date of Patent: Sep. 4, 2012

(54) METHODS FOR DISTRIBUTING LOG BLOCK ASSOCIATIVITY FOR REAL-TIME SYSTEM AND FLASH MEMORY DEVICES PERFORMING THE SAME

(75) Inventors: Young-Ik Eom, Seongnam-si (KR); Dong-Kun Shin, Seoul (KR); Hyun-Jin Cho, Seoul (KR)

(73) Assignee: Sungkyunkwan University Foundation for Corporate Collaboration, Gyeonggi-Do (KR)

( * ) Notice: Subject to any disclaimer, the term of this patent is extended or adjusted under 35 U.S.C. 154(b) by 763 days.

(21) Appl. No.: 12/356,306

(22) Filed: Jan. 20, 2009

(65) Prior Publication Data

US 2010/0169544 A1   Jul. 1, 2010

(30) Foreign Application Priority Data

Dec. 31, 2008   (KR) .................. 10-2008-0138191

(51) Int. Cl.
*G06F 13/00* (2006.01)
*G06F 13/28* (2006.01)

(52) U.S. Cl. ............... 711/103; 711/165; 711/E12.002

(58) Field of Classification Search .......... 711/103, 711/165, E12.002
See application file for complete search history.

(56) References Cited

U.S. PATENT DOCUMENTS

| | | | | |
|---|---|---|---|---|
| 6,185,663 | B1 * | 2/2001 | Burke | 711/156 |
| 6,219,752 | B1 * | 4/2001 | Sekido | 711/114 |
| 6,938,116 | B2 * | 8/2005 | Kim et al. | 711/103 |
| 2005/0144360 | A1 * | 6/2005 | Bennett et al. | 711/103 |
| 2008/0098195 | A1 * | 4/2008 | Cheon et al. | 711/202 |
| 2008/0104309 | A1 * | 5/2008 | Cheon et al. | 711/103 |
| 2008/0189490 | A1 * | 8/2008 | Cheon et al. | 711/144 |
| 2008/0201518 | A1 * | 8/2008 | Kim et al. | 711/103 |

\* cited by examiner

*Primary Examiner* — Edward Dudek, Jr.
(74) *Attorney, Agent, or Firm* — Harness, Dickey & Pierce, P.L.C.

(57) ABSTRACT

A method for distributing log block associativity in log buffer-based flash translation layer (FTL) includes, if write request on page p is generated, checking whether log block associated with corresponding data block that write request is generated exists or not by checking log block mapping table storing mapping information between data blocks and log blocks, wherein the associativity of each log block to data block is set to equal to or less than predetermined value K in advance, and K is a natural number, if log block associated with corresponding data block that write request is generated exists, checking whether associated log block is random log block or sequential log block, and if associated log block is random log block, writing data that write request is generated in first free page of random log block.

8 Claims, 38 Drawing Sheets

Hybrid-level mapping

Full merge

Partial merge

FIG. 11G

| data block | | | | | | log block | | | | log block mapping table | |
|---|---|---|---|---|---|---|---|---|---|---|---|
| B0 | B1 | B2 | B3 | B4 | B5 | L0 | L1 | L2 | L3 | LBN | LLBN |
| p0 | p4 | p8 | p12 | p16 | p20 | p1 | | | | B0 | L0 |
| p1 | p5 | p9 | p13 | p17 | p21 | p2 | | | | | |
| p2 | p6 | p10 | p14 | p18 | p22 | p3 | | | | | |
| p3 | p7 | p11 | p15 | p19 | p23 | | | | | | |

FIG. 11I

| data block | | | | | | log block | | | | log block mapping table | |
|---|---|---|---|---|---|---|---|---|---|---|---|
| B0 | B1 | B2 | B3 | B4 | B5 | L0 | L1 | L2 | L3 | LBN | LLBN |
| p0 | p4 | p8 | p12 | p16 | p20 | p1 | p5 | | | B0 | L0 |
| p1 | p5 | p9 | p13 | p17 | p21 | p2 | p6 | | | B1 | L1 |
| p2 | p6 | p10 | p14 | p18 | p22 | p3 | p7 | | | | |
| p3 | p7 | p11 | p15 | p19 | p23 | | | | | | |

FIG. 12A

| B0 | B1 | B2 | B3 | B4 | B5 |
|----|----|----|----|----|----|
| p0 | p4 | p8 | p12 | p16 | p20 |
| p1 | p5 | p9 | p13 | p17 | p21 |
| p2 | p6 | p10 | p14 | p18 | p22 |
| p3 | p7 | p11 | p15 | p19 | p23 |

| L0 | L1 | L2 | L3 |
|----|----|----|----|
| p1 | p5 | p9 | p13 |
|    |    |    |    |
|    |    |    |    |
|    |    |    |    |

FIG. 12B

| B0 | B1 | B2 | B3 | B4 | B5 |
|---|---|---|---|---|---|
| p0 | p4 | p8 | p12 | p16 | p20 |
| p1 | p5 | p9 | p13 | p17 | p21 |
| p2 | p6 | p10 | p14 | p18 | p22 |
| p3 | p7 | p11 | p15 | p19 | p23 |

| L0 | L1 | L2 | L3 |
|---|---|---|---|
| p1 | p5 | p9 | p13 |
| p17 |  |  |  |
|  |  |  |  |
|  |  |  |  |

FIG. 12C

|    | B0  | B1 | B2  | B3  | B4  | B5  |
|----|-----|----|-----|-----|-----|-----|
|    | p0  | p4 | p8  | p12 | p16 | p20 |
|    | p1  | p5 | p9  | p13 | p17 | p21 |
|    | p2  | p6 | p10 | p14 | p18 | p22 |
|    | p3  | p7 | p11 | p15 | p19 | p23 |

| L0  | L1  | L2 | L3  |
|-----|-----|----|-----|
| p1  | p20 | p9 | p13 |
| p17 | p21 | p6 |     |
| p2  |     |    |     |
|     |     |    |     |

FIG. 13A

Data block

| B0 | B1 | B2 | B3 | B4 | B5 |
|----|----|----|----|----|----|
| 0  | 8  | 16 | 24 | 32 | 40 |
| 1  | 9  | 17 | 25 | 33 | 41 |
| 2  | 10 | 18 | 26 | 34 | 42 |
| 3  | 11 | 19 | 27 | 35 | 43 |
| 4  | 12 | 20 | 28 | 36 | 44 |
| 5  | 13 | 21 | 29 | 37 | 45 |
| 6  | 14 | 22 | 30 | 38 | 46 |
| 7  | 15 | 23 | 31 | 39 | 47 |

Log block(1)

| L0 | L1 | L2 | L3 |
|----|----|----|----|
| 1  | 9  | 17 | 25 |
|    |    |    |    |
|    |    |    |    |
|    |    |    |    |
|    |    |    |    |
|    |    |    |    |
|    |    |    |    |
|    |    |    |    | log block mapping table(1)

| LBN | LLBN | Kind | Associativity |
|-----|------|------|---------------|
| B0  | L0   | RLB  | 1             |
| B1  | L1   | RLB  | 1             |
| B2  | L2   | RLB  | 1             |
| B3  | L3   | RLB  | 1             |

FIG. 13B

Log block(2)

| L0 | L1 | L2 | L3 |
|----|----|----|----|
| 32 | 40 | 17 | 25 |
| 33 | 41 | 2  | 10 |
| 34 |    |    |    |
|    |    |    |    |
|    |    |    |    |
|    |    |    |    |
|    |    |    |    | log block mapping table(2)

| LBN   | LLBN | Kind | Associativity |
|-------|------|------|---------------|
| B4    | L0   | SLB  | 1             |
| B5    | L1   | SLB  | 1             |
| B0,B2 | L2   | RLB  | 2             |
| B1,B3 | L3   | RLB  | 2             |

FIG. 13C

Log block(3)

| L0 | L1 | L2 | L3 |
|----|----|----|----|
| 32 | 40 | 3  | 25 |
| 33 | 41 |    | 10 |
| 34 |    |    |    |
|    |    |    |    |
|    |    |    |    |
|    |    |    |    |
|    |    |    |    | log block mapping table(3)

| LBN   | LLBN | Kind | Associativity |
|-------|------|------|---------------|
| B4    | L0   | SLB  | 1             |
| B5    | L1   | SLB  | 1             |
| B0    | L2   | RLB  | 1             |
| B1,B3 | L3   | RLB  | 2             |

V: valid page, I: invalid page, F: free page

V: valid page, I: invalid page, F: free page

V: valid page, I: invalid page, F: free page

V: valid page, I: invalid page, F: free page

Internet explorer

Internet explorer

PC Applications

METHODS FOR DISTRIBUTING LOG BLOCK ASSOCIATIVITY FOR REAL-TIME SYSTEM AND FLASH MEMORY DEVICES PERFORMING THE SAME

CLAIM FOR PRIORITY

This application claims priority to Korean Patent Application No. 2008-0138191 filed on Dec. 31, 2008 in the Korean Intellectual Property Office (KIPO), the entire contents of which are hereby incorporated by reference.

BACKGROUND

1. Technical Field

Example embodiments of the present invention relate to flash memory and more specifically to a method for distributing log block associativity in a flash memory and a flash memory device performing the same.

2. Description of the Related Art

A flash memory is a non-volatile memory and is greatly classified into a NOR flash memory which has a characteristic of a random memory and a NAND flash memory which has a similar characteristic to a storage medium such as a hard disk.

In an internal structure, as shown in FIG. 1, a NAND flash memory includes a plurality of blocks each of which includes a plurality of pages. For example, one block can include 64 pages or 128 pages.

A NAND flash memory performs read and write operations a unit of page and an erase operation in a unit of block. For example, a read operation is performed at a speed of about 25 us, a write operation is performed at a speed of about 250 us, and an erase operation is performed at a speed of about 2,000 us. That is, the respective operations are asymmetric in speed, and an erase operation is slowest.

A hard disk drive (HDD) can overwrite data on a physically same area as existing data when a data update is required (in-place update). However, a NAND flash memory can perform a write operation only in a state that a corresponding area is erased. That is, a NAND flash memory has a feature that new information can be written only in a block which is already erased. Due to this feature, a NAND flash memory cannot overwrite directly at a location that data is previously written, and should write at a new location (out-place update) and then update location information.

Also, in a flash memory, the number of writing/erasing times is limited to equal to or less than the predetermined number of times (for example, 100,000 times), and thus if a certain block is used more than the predetermined number of times, the block cannot be normally used (cannot perform a new write operation) any more. For this reason, when an update on information is required, a wear leveling technique that erases a corresponding block for the next operation but writes information in a new block without erasing a corresponding block and writing in an erased block is commonly used.

Therefore, a NAND flash memory needs to perform a periodic erase operation as well as read and write operations in order to input or output user data. An erase operation is performed at the slowest speed among operations of a NAND flash memory as described above, and this feature is the biggest shortcoming of a NAND flash memory compared to a hard disk.

Due to the above-described inherent features of the NAND flash memory, system software called a flash translation layer (hereinafter, "FTL") is commonly used between a file system of a host system and a NAND flash memory. The FTL functions to hide the inherent features of the NAND flash memory in the file system of the host system and maps a logical address transmitted from the file system with a physical address of the NAND flash memory so that the same input/output operation as a hard disk can be performed.

There are three mapping techniques for mapping a logical address of a file system with a physical address of a NAND flash memory: page-level mapping; block-level mapping; and hybrid-level mapping.

A page-level mapping technique maps data of a NAND flash memory in a unit of page. A page-level mapping technique has a disadvantage in that the size of a mapping table which stores mapping information increases as a storage space of a large-capacity NAND flash memory such as a solid state drive (SSD) increases.

A block-level mapping technique maps data of a NAND flash memory in a unit of block and accesses a corresponding area with a block number and an offset of the block inside. A block-level mapping technique has an advantage in that the size of a mapping table is greatly reduced compared to a page-level mapping technique but has a disadvantage in that an overhead of a data update is increased. That is, since data mapping is performed in a unit of block, if an update request on a certain page (for example, p2 201 of FIG. 2A) is generated, a newly updated page has to be written in a new block, and remaining pages (p0, p1 and p3 of FIG. 2A) have to be copied to the new block from an existing block (see FIG. 2A).

A hybrid-level mapping technique has been suggested to improve such an overhead problem. In a hybrid-level mapping technique, all physical blocks of a NAND flash memory are classified into data blocks and log blocks. Data in a data block is input or output using a block-level mapping technique, and data in a log block is input or output using a page-level mapping technique.

As a FTL hybrid-level mapping technique, there are a block associative sector translation (BAST) technique, a fully associative sector translation (FAST) technique, and a set associative sector translation (SAST) technique.

A hybrid-level mapping technique called a BAST technique is a 1:1 log block mapping technique. In a BAST technique, if a first data write request is generated and sent to a FTL, data is written in a data block using a block-level mapping technique. As shown in FIG. 2A, if an update on data written in a data block is required, a data update is performed in a log block. That is, previous data written in a data block (for example, page p2 203 of FIG. 2B) is invalidated, and then data to be updated is sequentially written in a log block allocated, starting from a first page.

In a BAST technique, even though a certain page is frequently updated, unlike a block-level mapping technique, remaining pages do not need to be copied until all pages of a corresponding log block are used. If an update on a new data block is required in a state that all log blocks are allocated, one of the log blocks is merged to allocate a new log block. Such a merge operation includes a full merge operation, a partial merge operation and a switch merge operation. An appropriate merge operation is selected according to an order of data written in a log block.

FIGS. 3A and 3B are schematic diagrams illustrating a data update procedure of a conventional BAST technique. It is assumed that total 6 data blocks B0 to B5 exist, and maximum 4 log blocks L0 to L3 can be allocated.

Referring to FIG. 3A, if an update on p1, p5, p9, and p13 is required, log blocks are designated for an update of corresponding data blocks. Thereafter, if an update on p17 is required, as shown in FIG. 3B, one of the log blocks is merged to allocate a new log block. The merge operation is performed in an order of a log block allocated to a data block. If a data update is performed in an order of p1, p5, p9, p13, p17, p20, p21, p2, and p6, a request is performed as shown in FIG. 3B.

If a write request pattern is random, a 1:1 mapping technique such as a BAST technique described above shows poor performance since frequent log block merges are inevitable. This is called a log block thrashing problem. For example, if a write pattern is a sequence of p0, p4, p8, p12, p16, p20, p1, p5, in a BAST technique, one of four log blocks should be replaced whenever a write operation of p16 or later is performed, leading to an expensive merge operation. In addition, as shown in FIG. 3B, when replaced, each victim log block maintains only one page, and the other three pages remain empty. Thus, in a BAST technique, log blocks show very low space utilization when a victim log block is replaced with a new log block (buffer).

To solve the above problem of a 1:1 mapping technique, a FAST technique as an N:1 log block mapping technique has been introduced. FIG. 4 shows a schematic diagram illustrating a data update procedure of a conventional FAST technique.

A FAST technique is a technique to solve a block thrashing problem of a BAST technique. In a FAST technique, data blocks are associated with a log block in an N:1 method (N denotes the total number of data blocks, and 1 denotes the number of log blocks). Also, all log blocks are divided into a random log block and a sequential log block, one sequential log block is maintained, and if an update of a page having an offset "0" is required, a data is written in a sequential log block.

In a FAST technique, pages updated in all data blocks can be written in one log block. Therefore, a data update is not performed only in a certain log block allocated to a corresponding data block, and updated pages are written in, starting from a first log block. That is, all pages of a first log block have to be filled before proceeding to a second log block. As shown in FIG. 4, a data update request is generated in an order of p1, p5, p9, p13, p17, p20, p21, p2, and p6 like a case of a BAST technique shown in FIGS. 3A and 3B. In this case, unlike a BAST technique, a 1:1 association is not made between a data block and a log block, and data is written in, starting from a first log block. Also, since p20 is a page having an offset "0" in a data block B5, it is written in a sequential log block (SLB), and p21 updated thereafter is written in the sequential log block (SLB) since p21 is a page having an offset "1" in the data block B5 and is data for maintaining the sequentiality of the sequential log block.

In a FAST technique, since only one sequential log block is maintained, whenever there is an update request on a page having an offset "0", a sequential log block has to undergo a partial merge. Also, if there is a write request on a page which cannot maintain the sequentiality of a sequential log block, a full merge operation is performed after writing in a sequential log block. This causes a block thrashing problem of a sequential log block, and there is a possibility that a partial merge and a full merge are performed in a state that the utilization of a sequential log block is low.

Then, when all log blocks are fully filled with data, a merge operation with associated data blocks is performed, starting from a first random log block.

The number of data blocks associated with each log block is defined as associativity, and random log blocks RLB0 and RLB1 of FIG. 4 have associativity values of 4 and 3, respectively.

As described above, in a FAST technique, a maximum value of associativity can be increased up to the number of pages of a log block. A merge operation value depends on the magnitude of the log block associativity, and the merge cost of one time merge operation can be expressed by Equation 1. Therefore, a FAST technique has a problem in that a time of a single merge operation cannot be expected.

$$\text{Merge cost} = A(LB) \times N \times C_{copy} + (A(LB)+1) \times C_{erase} \qquad \text{Equation 1,}$$

where $A(LB)$ denotes the associativity of a log block, N denotes the number of pages per block (pages_per_block), $C_{copy}$ is the cost of the page copy, and $C_{erase}$ denotes the cost of the block erase.

In a FAST technique, a difference between a worst-case block merge time and a best-case block merge time is large due to high block associativity. Therefore, neither of both cases is suitable to a real-time system which has to guarantee that an operation is completed within a fixed time.

As another FTL hybrid-level mapping technique, there is a SAST technique which uses an N:K log block mapping. In a SAST technique, blocks is divided into a data block group and a log block group, and respective groups are mapped with each other. The maximum number of blocks which can belong to a data block group is defined as N, and the maximum number of blocks which can belong to a log block group is defined as K.

FIG. 5 is a schematic diagram illustrating a data update procedure of a conventional SAST technique. FIG. 5 shows a case where the maximum block number N of a data block group is restricted to 3, and the maximum block number K of a log block group is restricted to 2.

As shown in FIG. 5, a data update occurring in a block group is performed in a corresponding log block group. Therefore, the maximum associativity of a log block is restricted depending on the maximum number N of blocks which constitute a data block group.

However, a SAST technique has a problem in that if data in a certain data block group is frequently updated compared to that in a different block group, a log block allocated to the different block group has to be merged with the low utilization. That is, a block thrashing (log block trashing) problem may occur like a BAST technique. In addition, since a sequential log block is not separately distinguished, the number of times of a partial merge and a switch merge can be decreased.

Therefore, since there is a limitation that an N:K mapping technique is a compromise of a 1:1 log block mapping technique and an N:1 log block mapping technique, an N:K mapping technique cannot solve both a block thrashing problem and a high block associativity problem completely.

A merge operation requires a long time, and a difference between a maximum value and a minimum value of the merge cost is large depending on the associativity. Particularly, in a real-time system, it is very important to estimate a deadline of processing.

SUMMARY

Accordingly, example embodiments of the present invention is provided to substantially obviate one or more problems due to limitations and disadvantages of the related art.

Example embodiments of the present invention provide a method for distributing the log block associativity in a log buffer-based FTL that an input/output operation can be performed within a restricted time when applied to a real-time system, thereby providing non-fluctuating stable input/output performance.

Example embodiments of the present invention also provide a flash memory device for a real-time system which performs the method.

In some example embodiments, a method for distributing a log block associativity in a log buffer-based flash translation layer (FTL) of a flash memory with physical blocks which include a plurality of data blocks which are identified by different logical block numbers and a plurality of log blocks which are identified by different logical log block numbers, includes: if a write request to write a page p in a log block is generated, checking whether a log block associated with a corresponding data block that the write request is generated exists or not by checking a log block mapping table which stores mapping information between the data blocks and the log blocks, where the associativity of each of the plurality of log blocks to a data block is set to equal to or less than a predetermined value K in advance, and K is a natural number; if a log block associated with a corresponding data block that the write request is generated exists, checking whether the associated log block is a random log block or a sequential log block; and if the associated log block is a random log block, writing data that the write request is generated in a first free page of the random log block.

The method further includes, if a log block associated with a corresponding data block that the write request is generated does not exist, writing data that the write request is generated to increase the associativity of a log block to a data block.

The writing data that the write request is generated to increase the associativity of a log block to a data block comprises distributing the log block associativity to maintain the log block associativity at minimum by writing data of data blocks having the same logical block number in the same log block and writing data of data blocks having different logical block numbers in different log blocks.

The writing data that the write request is generated to increase the associativity of a log block to a data block comprises: if a log block that a switch merge is possible exists, writing data that the write request is generated in a new log block after performing a switch merge; and if a log block that a switch merge is possible does not exist and a free log block exists, writing data that the write request is generated in an available free log block.

The writing data that the write request is generated to increase the associativity of a log block to a data block further comprises: if the switch merge is impossible and all log blocks are associated with at least one data block, determining whether the associativity of a currently allocated log block reaches the predetermined value K or not or an offset of data that the write request is currently generated is 0 or not; and if the associativity of a currently allocated log block does not reach the predetermined value K or an offset of data that the write request is currently generated is not 0, selecting a log block which has most free pages among log blocks having a minimum associativity to write data that the write request is generated.

The method further includes, if the associated log block is a sequential log block, checking whether the sequentiality of the associated sequential log block can be maintained or not; and if the sequentiality of the associated sequential log block can be maintained, writing data that the write request is generated in a first free page of the associated sequential log block.

The method further includes: if the sequentiality of the associated sequential log block cannot be maintained, checking the number of free pages of the associated sequential log block when the amplitude of a first offset of a last page currently written in the associated sequential log block is equal to or larger than the amplitude of a second offset of data that the write request is generated; and if the number of free pages is larger than a predetermined value, transforming the associated sequential log block to a random log block after writing data that the write request is generated in the associated sequential log block.

The method further includes, if the sequentiality of the associated log block cannot be maintained, writing data that the write request is generated in the associated sequential log block to maintain the sequential log block after copying data between intermediate offsets to the associated sequential log block when the amplitude of the first offset is smaller than the amplitude of the second offset and a gap between the first and second offsets is not larger than a predetermined gap.

The maximum number of sequential log blocks is variable, and the maximum number of sequential log blocks is equal to or more than 1.

In other example embodiments, a flash memory device, includes: a flash memory which includes a plurality of blocks each of which includes a plurality of pages; and a flash translation layer (FTL) which maps a logical address transmitted from a file system with a physical address of the flash memory using an address translation mapping table, wherein the FTL identifies a plurality of data blocks using different logical block numbers and a plurality of log blocks using different logical log block numbers, and the FTL performs: if a write request to write a page p in a log block is generated, checking whether a log block associated with a corresponding data block that the write request is generated exists or not by checking a log block mapping table which stores mapping information between the data blocks and the log blocks, where the associativity of each of the plurality of log blocks to a data block is set to equal to or less than a predetermined value K in advance, and K is a natural number; if a log block associated with a corresponding data block that the write request is generated exists, checking whether the associated log block is a random log block or a sequential log block; and if the associated log block is a random log block, writing data that the write request is generated in a first free page of the random log block.

The FTL further performs if a log block associated with a corresponding data block that the write request is generated does not exist, writing data that the write request is generated to increase the associativity of a log block to a data block.

The writing data that the write request is generated to increase the associativity of a log block to a data block comprises distributing the log block associativity to maintain the log block associativity at minimum by writing data of data blocks having the same logical block number in the same log block and writing data of data blocks having different logical block numbers in different log blocks.

The FTL further performs: if the associated log block is a sequential log block, checking whether the sequentiality of the associated sequential log block can be maintained or not; and if the sequentiality of the associated sequential log block can be maintained, writing data that the write request is generated in a first free page of the associated sequential log block.

The FTL further performs: if the sequentiality of the associated sequential log block cannot be maintained, checking the number of free pages of the associated sequential log block when the amplitude of a first offset of a last page currently written in the associated sequential log block is equal to or larger than the amplitude of a second offset of data that the write request is generated; and if the number of free pages is larger than a predetermined value, transforming the associated sequential log block to a random log block after writing data that the write request is generated in the associated sequential log block.

The FTL further performs, if the sequentiality of the associated log block cannot be maintained, writing data that the write request is generated in the associated sequential log block to maintain the sequential log block after copying data between intermediate offsets to the associated sequential log block when the amplitude of the first offset is smaller than the amplitude of the second offset and a gap between the first and second offsets is not larger than a predetermined gap.

The maximum number of sequential log blocks is variable, and the maximum number of sequential log blocks is equal to or more than 1.

BRIEF DESCRIPTION OF THE DRAWINGS

Example embodiments of the present invention will become more apparent by describing in detail example embodiments of the present invention with reference to the accompanying drawings, in which:

FIGS. 11F to 11I are schematic diagrams illustrating a data writing procedure for increasing the associativity of the log block according to the exemplary embodiment of the present invention;

FIGS. 12A to 12C are schematic diagrams illustrating a data update procedure of a method for distributing the log block associativity in a log buffer-based FTL according to an exemplary embodiment of the present invention as a first scenario;

FIGS. 13A to 13C are schematic diagrams illustrating a procedure for writing data into a log block according to an exemplary embodiment of the present invention as a second scenario;

DETAILED DESCRIPTION OF EXAMPLE EMBODIMENTS

Figure 1:
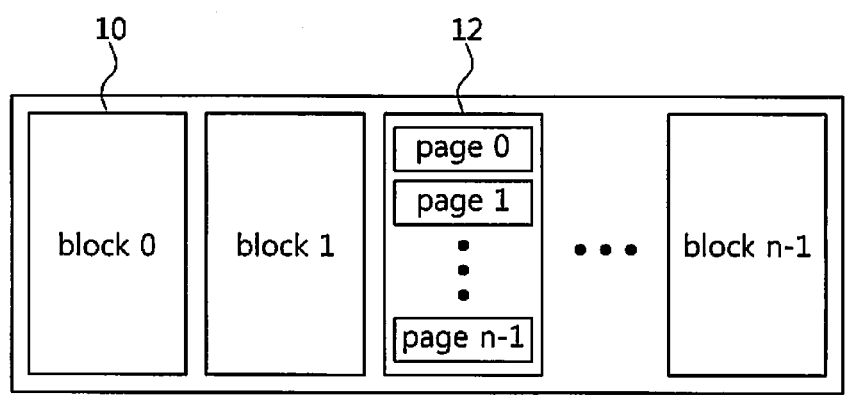
FIG. 1 is a schematic diagram illustrating a structure of a typical flash memory.
Figure 2A:
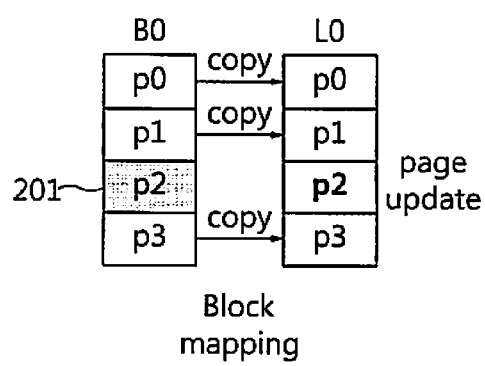
FIG. 2A is a schematic diagram illustrating a conventional block-level mapping to technique.
Figure 2B:
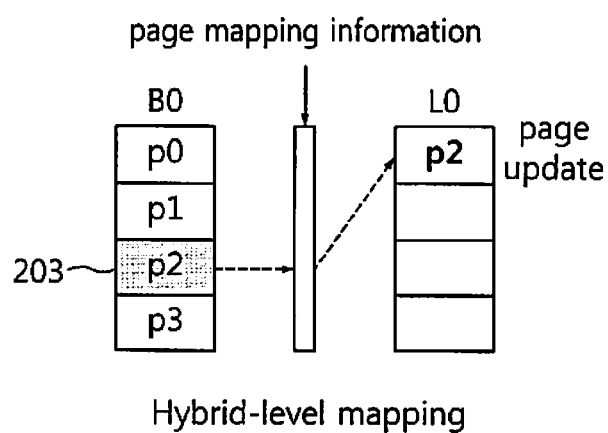
FIG. 2B is a schematic diagram illustrating a BAST mapping technique as a conventional hybrid-level mapping technique.
Figure 3A:
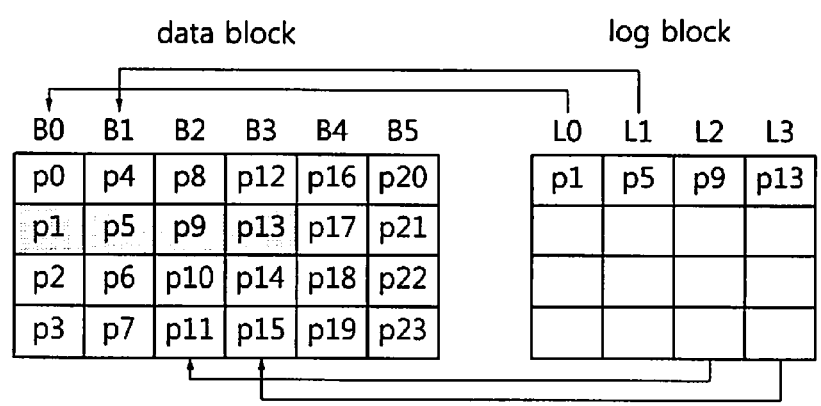
FIGS. 3A and 3B are schematic diagrams illustrating a data update procedure of a conventional BAST technique.
Figure 3B:
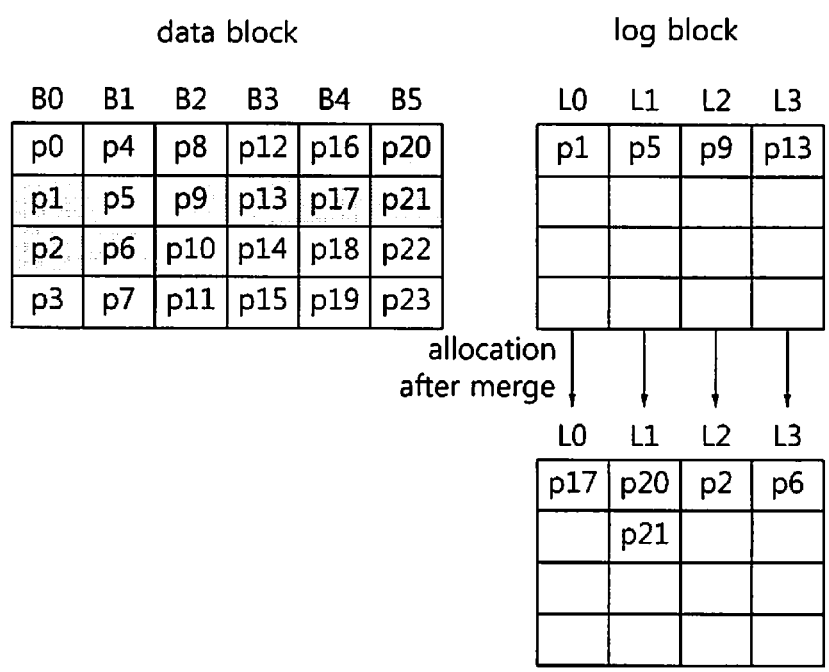
Figure 4:
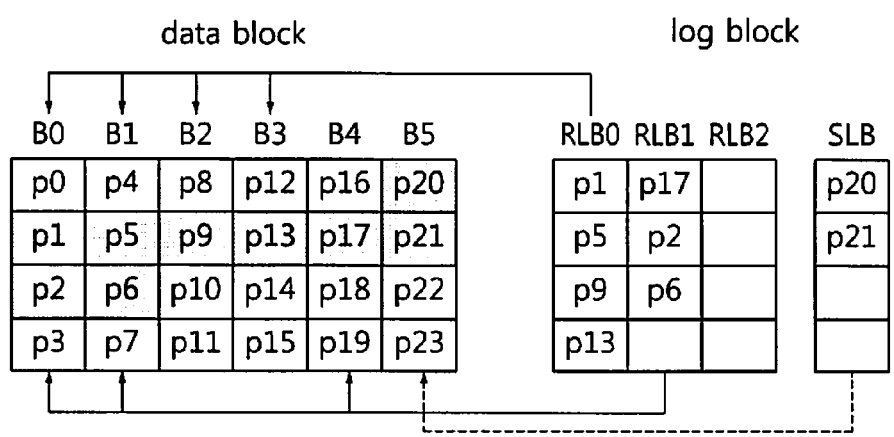
FIG. 4 shows a schematic diagram illustrating a data update procedure of a conventional FAST technique.
Figure 5:
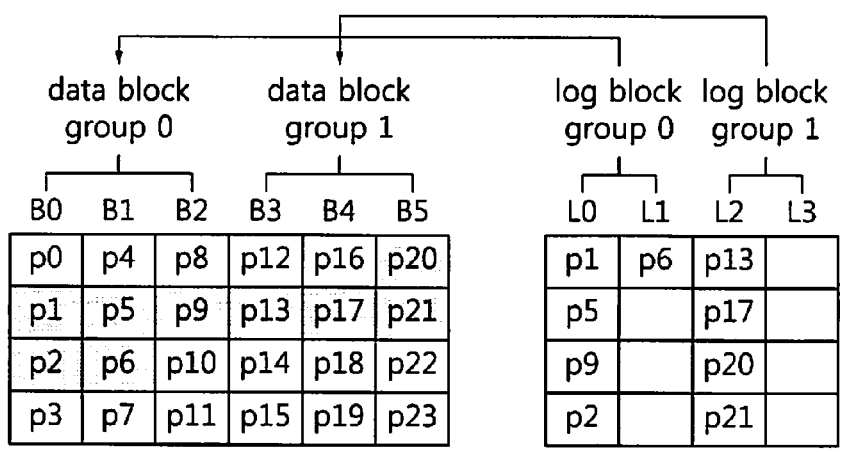
FIG. 5 is a schematic diagram illustrating a data update procedure of a conventional SAST technique.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

Figure 6:
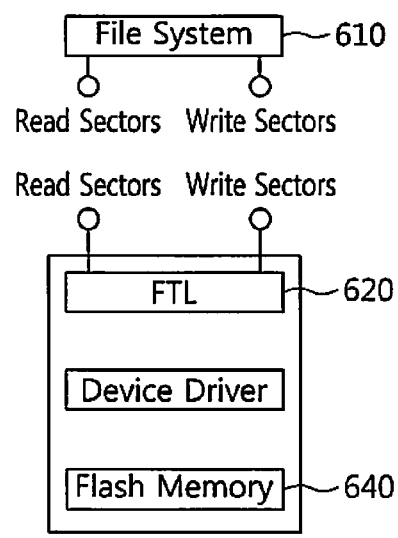
FIG. 6 is a schematic diagram illustrating a flash memory device according to an exemplary embodiment of the present invention.

FIG. 6 is a schematic diagram illustrating a flash memory device according to an exemplary embodiment of the present invention.

Referring to FIG. 6, the flash memory device according to the present invention includes a FTL 620 and a flash memory 640.

The FTL 620 exists between a file system 610 of a host system and the flash memory 640.

The flash memory 640 includes a plurality blocks each of which includes a plurality of pages.

The FTL 620 hides inherent features of the flash memory 640 in the higher-level file system 610, and the host system effectively controls the flash memory 640 using the file system 610 such as a file allocation table (FAT) so that the same input/output operation as a hard disk can be performed. One of roles of the FTL 620 is mapping a logical address transmitted from the file system 610 with a physical address of a NAND flash memory using an address translation mapping table. Part of a function of the FTL 620 can be implemented by hardware.

The FTL 610 makes the file system 610 conceive that a logical address is not changed and only a corresponding physical block is changed when a corresponding block is erased and a new block is allocated. The FTL 610 performs functions such as garbage collection, wear leveling, background erase, and bad block management.

The FTL 610 performs a method for distributing the log block associativity according to the exemplary embodiment of the present invention. The method for distributing the log block associativity according to the exemplary embodiment of the present invention will be described later in detail with reference to FIGS. 8 to 14D.

A hybrid-level mapping technique is recently widely used, and in a hybrid-level mapping technique, all physical blocks are classified into a log block and a data block. A log block is called a log buffer.

Hereinafter, a FTL using a hybrid-level mapping technique is referred to as "log buffer-based FTL".

The method for distributing the log block associativity in the log buffer-based FTL according to the exemplary embodiment of the present invention is referred to as "K-associative sector translation (KAST)".

In the KAST technique, all log blocks are classified into a random log block (RLB) and a sequential log block (SLB). The KAST technique is different from the SAST technique in the fact that data blocks and log blocks are not grouped.

In the KAST technique, when an update on a page that an offset of a data block is 0 is required, data is written in a sequential log block. At least two sequential log blocks can be maintained.

In the method for distributing the log block associativity in the log buffer-based FTL according to the exemplary embodiment of the present invention, the associativity of a log block is distributed, and the associativity K of the log block is set and restricted to a predetermined value in advance, whereby a maximum value of a time taken in performing a single merge operation can be estimated, and the whole merge cost occurring by the merge operation can be minimized.

In the method for distributing the log block associativity in the log buffer-based FTL according to the exemplary embodiment of the present invention, the following three operations can be performed.

First, in the method for distributing the log block associativity in the log buffer-based FTL according to the exemplary embodiment of the present invention, data blocks and log blocks are not grouped, and the associativity is distributed to all log blocks in order to reduce an input/output time. The SAST technique cannot avoid the block trashing problem since data blocks and log blocks are grouped, but the method for distributing the log block associativity in the log buffer-based FTL according to the exemplary embodiment of the present invention sets and limits a maximum value of the associativity of each log block in advance. Also, in the method for distributing the log block associativity in the log buffer-based FTL according to the exemplary embodiment of the present invention, in order to minimize the associativity of the log blocks, write requests on data blocks having different logical block numbers (LBNs) such as B0, B1, B2, and B3 are distributed to log blocks having different logical log block numbers (LLBNs).

Second, in order to estimate a maximum value of the operation cost of a single merge operation, the associativity of each log block is restricted. That is, each log block is restricted to be associated with the maximum k number of data blocks, and a value of K is set in advance. Therefore, the associativity of the log block is guaranteed to be equal to or less than K, and the worst-case log block merge time can be controlled by adjusting the value of K.

Third, unlike the FAST technique which maintains one sequential log block, the number of sequential log blocks is variable and has a maximum value. A sequential log block (SLB) can be transformed into a random log block (RLB) under condition that there is no sequential write request. The number of sequential log blocks can be varied to 0, 1, or 2, and the number of log blocks can be the maximum value of the sequential log block number.

Figure 7:
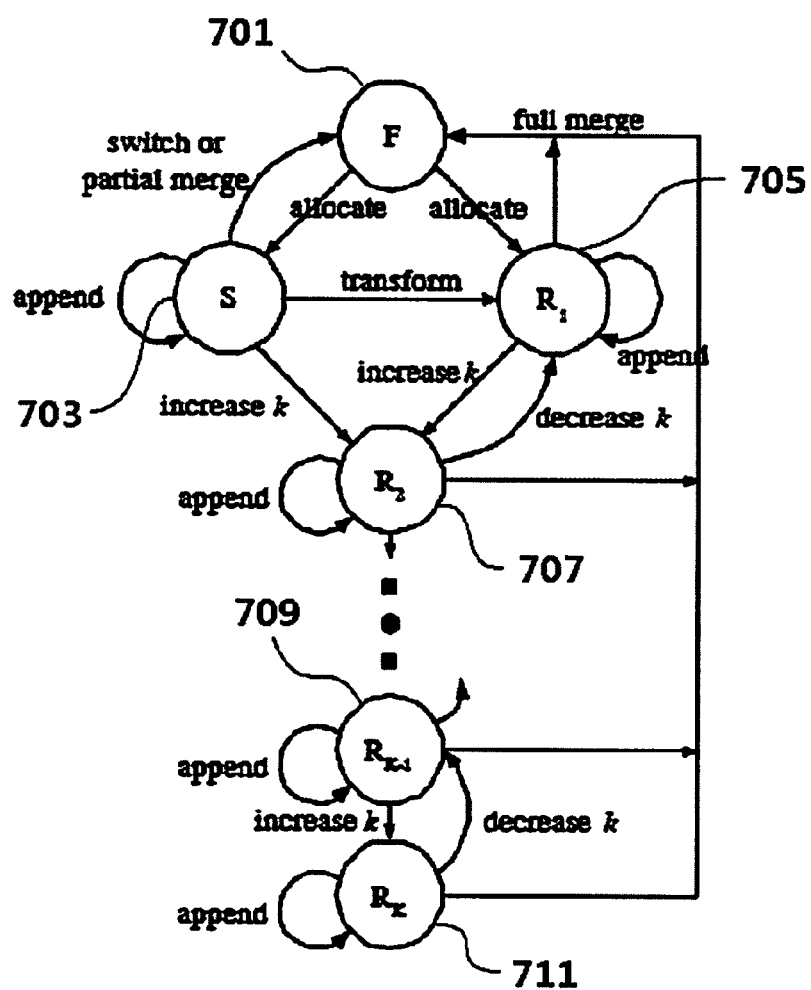
FIG. 7 is a state transition diagram of a log block in a method for distributing the log block associativity in a log buffer-based FTL according to an exemplary embodiment of the present invention.

FIG. 7 is a state transition diagram of a log block in the method for distributing the log block associativity in the log buffer-based FTL according to the exemplary embodiment of the present invention. In FIG. 7, F denotes a free block, S denotes a sequential log block, $R_i$ denotes a random log block with a block associativity of i.

Referring to FIG. 7, all log blocks are initially free blocks which do not have any data at all (state 701). The free block transitions to the sequential log block (state 703)) or the random log block (step 705).

If a page p is written into a random log block L of an $R_i$ state on condition of $d(p) \square A(L)$ (here, d(p) denotes the corresponding data block of the page p, and A(L) denotes a set of data blocks relevant to the log block L) in the method for distributing the log block associativity in the log buffer-based FTL according to the exemplary embodiment of the present invention, the log block L sustains the $R_i$ state.

If a page is appended to the sequential log block without breaking the sequentiality of the sequential log block in the method for distributing the log block associativity in the log buffer-based FTL according to the exemplary embodiment of the present invention, the sequential log block maintains an S state.

If a page p is written into the random log block L with the $R_i$ state on condition of $d(p) \notin A(L)$, $R_i$ is transformed into the state of $R_{i+1}$. Here, the random log block L with the state of $R_{i+1}$ can be changed to the state of Ri if one page of the random log block L is invalidated as the same page is written in any other log block.

The sequential log block can be transformed to the random log block with a $R_1$ or $R_2$ state only if a small portion of the sequential log block is occupied by valid data. While the sequential log block is changed to a F state by the partial or switch merge operation, the random log block is changed to the F state by the full merge operation. The full merge cost of the random log block with the $R_i$ state can be obtained by Equation 2:

$$\text{Full merge cost} = N \cdot i \cdot C_{copy} + (i+1) \cdot C_{erase} \quad \text{Equation 2,}$$

where N denotes the number of pages per block (pages_per_block), i denotes the associativity of the log block, $C_{copy}$ denotes the operation cost of the page copy, and $C_{erase}$ denotes the operation cost of the block erase. The associativity of the log block is defined by the number of data blocks associated with each log block.

The method for distributing the log block associativity in the log buffer-based FTL according to the exemplary embodiment of the present invention will be described below in detail.

Figure 8:
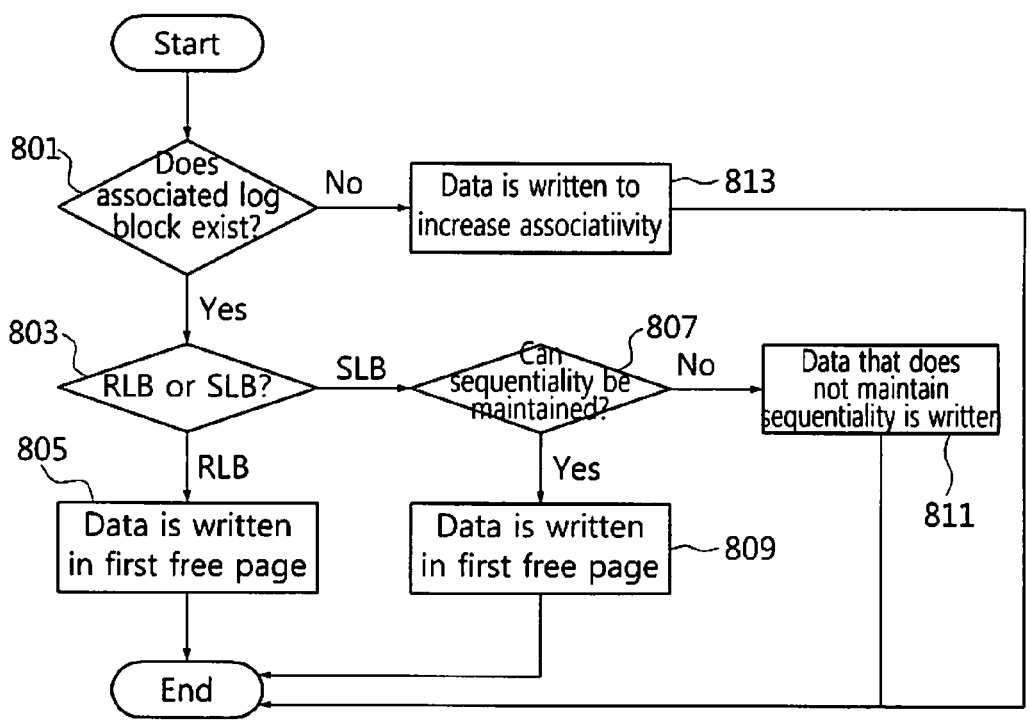
FIG. 8 is a flowchart illustrating a procedure for writing data into a log block in a method for distributing the log block associativity in a log buffer-based FTL according to an exemplary embodiment of the present invention.

FIG. 8 is a flowchart illustrating a procedure for writing data into a log block in the method for distributing the log block associativity in the log buffer-based FTL according to the exemplary embodiment of the present invention.

If an update request on a page p written in a data block is generated, a write request of the page p is generated in a log block in order to update the page p.

If the write request of the page p is generated in a log block, it is checked whether a log block associated with a corresponding data block that the data update request is generated exists or not by checking a log block mapping table (that is, it is checked whether a log block already allocated to a corresponding data block exists or not) (step 801). Initially, a log block is not allocated to the log block mapping table, and a logical log block number LLBN associated with a logical block number LBN of each data block is stored in the log block mapping table during an update operation of data written in a data block.

If the allocated log block exists, it is checked whether the corresponding log block is a random-write log block (RLB) or a sequential-write log block (SLB) (step 803).

If the allocated log block is the random log block, data is written on the first free page of the random log block (step 805).

If the allocated log block is the sequential log block, it is checked whether the sequentiality of the current sequential log block can be maintained or not (step 807).

If it is determined in step 807 that the sequentiality of the current sequential log block can be maintained, data is written on the last free page of the sequential log block (step 809).

However, if it is determined in step 807 that the sequentiality of the current sequential log block cannot be maintained, an attempt for writing data which cannot maintain the sequentiality in the sequential log block is made (step 811). A procedure for writing data which cannot maintain the sequentiality in the sequential log block will be described later in detail with reference to FIG. 9.

If it is determined in step 801 that there is no log block allocated to the log block mapping table, data writing for increasing the associativity of the log block is attempted (step 813). When a write request to a log block is generated, if a log block which has an LLBN associated with an LBN of current data that the write request is generated exist, the associativity is not increased even though data is written into a corresponding log block. However, if there is no log block which has an LLBN associated with an LBN of current data that the write request is generated (if there is no log block previously allocated to the log block mapping table), data is written into any other log block. At this time, the associativity of the log block is increased by +1. For example, if data is written into a free log block, the associativity changes to 1 from 0, and if data is written into a log block that the associativity is 3, the associativity becomes 4. The data writing procedure for increasing the associativity of the log block will be described later in detail with reference to FIG. 10.

Figure 9:
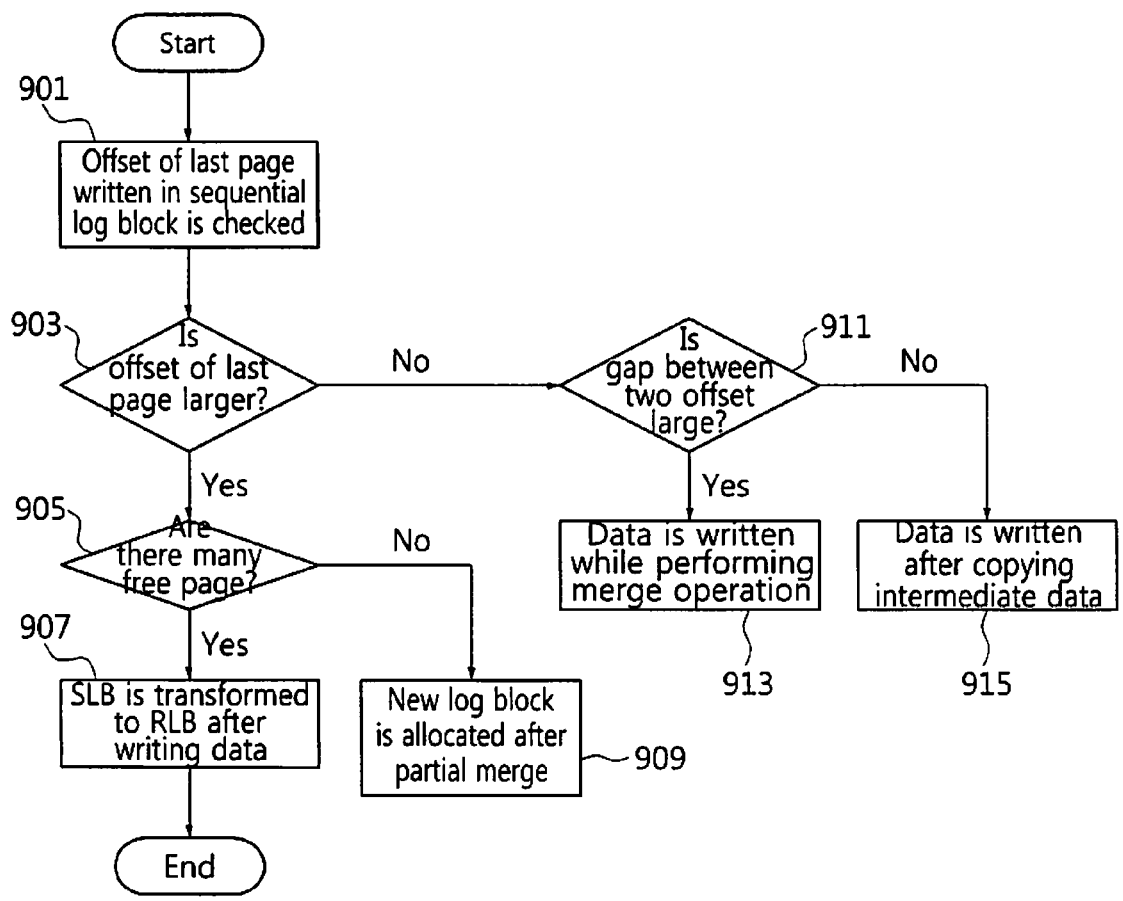
FIG. 9 is a flowchart illustrating a procedure for writing data which cannot maintain the sequentiality in a sequential log block in step 811 of FIG. 8.

FIG. 9 is a flowchart illustrating a procedure for writing data which cannot maintain the sequentiality in the sequential log block in step 811 of FIG. 8.

First, an $offset_{last}$ of the last page currently written in the allocated sequential log block is checked (step 901).

The amplitude of the $offset_{last}$ of the last page currently written in the sequential log block is compared to the amplitude of the $offset_{lsn}$ of data that the update request is currently generated (step 903).

If the amplitude of the $offset_{last}$ of the last page currently written in the sequential log block is equal to or more than the amplitude of the $offset_{lsn}$ of data that the update request is current generated ($offset_{last} \geq offset_{lsn}$), the number of free pages of the allocated sequential log block is checked (step 905).

If the number of free pages is larger than a predetermined value, data that the update request is generated is written in the allocated sequential log block, and then the allocated sequential log block is transformed into the random log block (step 907). The predetermined value can be determined as one (for example, 8) of many values by an experiment.

If the number of free pages is smaller than the predetermined value, the allocated sequential log block is partially merged, and then a new log block is allocated, and data that the update request is generated is written at a first offset (step 909).

If the last offset is smaller ($offset_{last} < offset_{lsn}$), a gap ($gap = offset_{lsn} - offset_{last}$) between the two offsets is compared (step 911).

If the gap between the two offsets is larger than a predetermined gap, data that the update request is generated is written while performing the merge operation of the log block (step 913). The predetermined gap can be a value (for example, 5) which is larger than 4.

However, if the gap between the two offsets is not larger than the predetermined gap, after padding data between intermediate offsets to the sequential log block, data that the update request is currently generated is written into the sequential log block to maintain the sequential log block (step 915).

Figure 10:
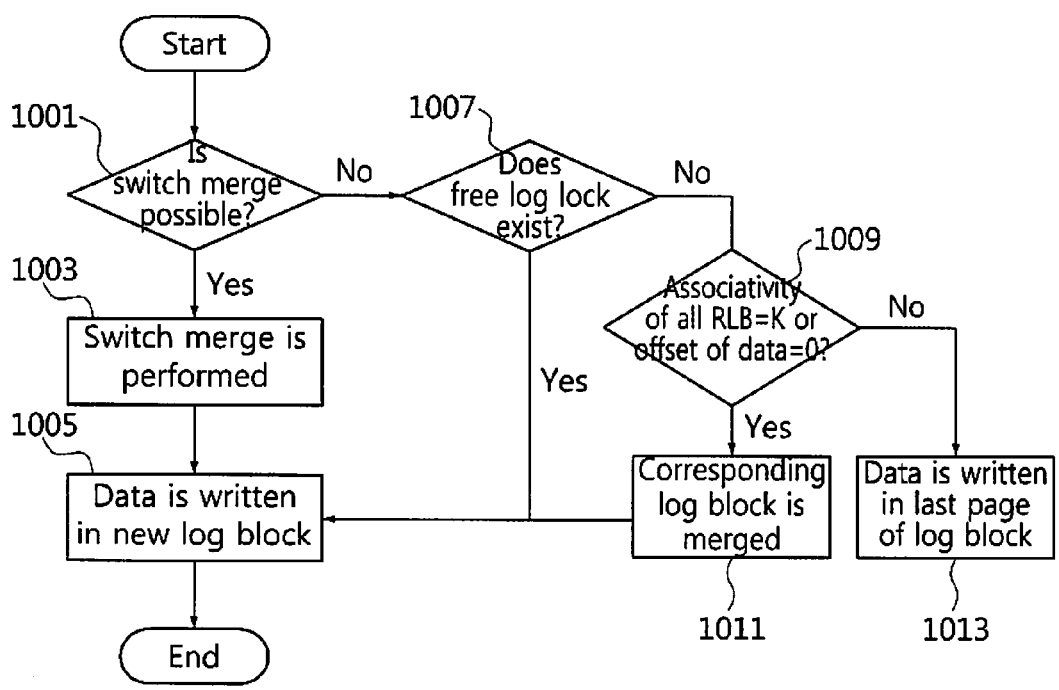
FIG. 10 is a flowchart illustrating a procedure for writing data to increase the associativity of a log block in step 813 of FIG. 8.

FIG. 10 is a flowchart illustrating a procedure for writing data to increase the associativity of the log block in step 813 of FIG. 8.

Referring to FIG. 10, it is checked whether there is a log block which can be switch-merged or not (step 1001).

If a log block which can be switch-merged exists, the switch merge is performed (step 1003), and then data that the update request is currently generated is written into a new log block (step 1005).

If the switch merge is impossible, it is checked whether a free log block exists or not (step 1007).

If it is determined in step 1007 that there is a free log block which can be newly allocated, the procedure proceeds to step 1005, so that data is written into a new free log block.

If the switch merge is impossible and all log blocks are associated with at least one data block, it is checked if a maximum value K of the associativity of the currently allocated log block is reached or not or the offset of data that the update request is currently generated is 0 or not (step 1009).

If it is determined in step 1009 that a maximum value K of the associativity of the currently allocated log block is reached or the offset of data that the update request is currently generated is 0, the log block is selected to be merged (step 1011). Here, in selecting a log block for the merge operation, a log block which can be partial-merged can be first selected, and a log block which can be full-merged can be next selected.

However, it is determined in step 1009 that a maximum value A of the associativity of the currently allocated log block is not reached or the offset of data that the update request is currently generated is not 0, one of the log blocks is selected, and data on which the write request is generated is written into the first free page. Here, a log block having the lowest associativity among the log blocks can be selected (step 1013). If there exist two or more log blocks having the lowest associativity, a log block which has more free pages can be selected.

Figure 11A:
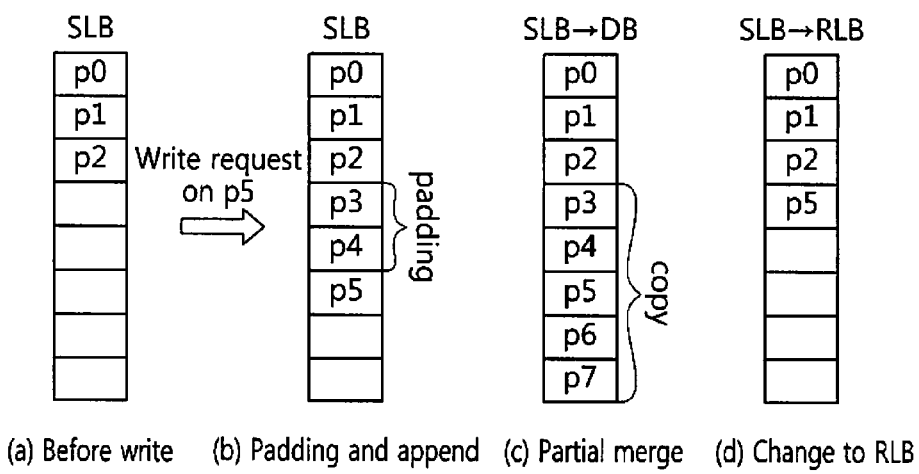
FIG. 11A is a schematic diagram illustrating a case that a sequential log block is transformed to a random log block according to an exemplary embodiment of the present invention.

FIG. 11A is a schematic diagram illustrating a case that a sequential log block is transformed to a random log block according to the exemplary embodiment of the present invention.

For example, it is assumed that pages p0, p1 and p2 are stored in a currently allocated sequential log block, and there is an update request on a current page p5.

In case where the gap (gap=offset$_{lsn}$−offset$_{last}$) between the offset$_{last}$ of the last page currently written in the sequential log block of step 901 of FIG. 9 and the offset$_{lsn}$ of data that the update request is currently generated is smaller than the predetermined gap, as shown in a part (b) of FIG. 11A, after filling (padding) the gap, the sequential log bloc is filled with data that the update request is currently generated.

If the gap is larger than the predetermined gap and the number of free pages in the current log block is smaller than the predetermined value, as shown in a part (c) of FIG. 11A, data is written into the sequential log block while performing the partial merge.

If the gap is larger than the predetermined gap and the number of free pages in the current log block is larger than the predetermined value, as shown in a part (d) of FIG. 11A, after writing data into the sequential log block, the sequential log block is transformed to the random log block. As described above, if the gap is larger than the predetermined gap and there are many free pages, it is expected that there is little possibility that a sequential write will be requested on the sequential log block. Also, if the gap is larger than the predetermined gap and there are many free pages in the current log block, it is more preferable to transform the sequential log block to the random log block and use the random log block with respect to the on-going write request than to perform the partial merge.

As shown in FIG. 11A, the method for distributing the log block associativity in the log buffer-based FTL according to the exemplary embodiment of the present invention uses a sequential log block as possible as it can. If there is no free log block and the log block corresponding to the logic block number of the data block is not allocated, the method for distributing the log block associativity in the log buffer-based FTL according to the exemplary embodiment of the present invention increases the block associativity of the log block. In a special case, the sequential log block can be associated with only one data block. When the log block is allocated, it is determined whether it is the sequential log block or the random log block.

Figure 11B:
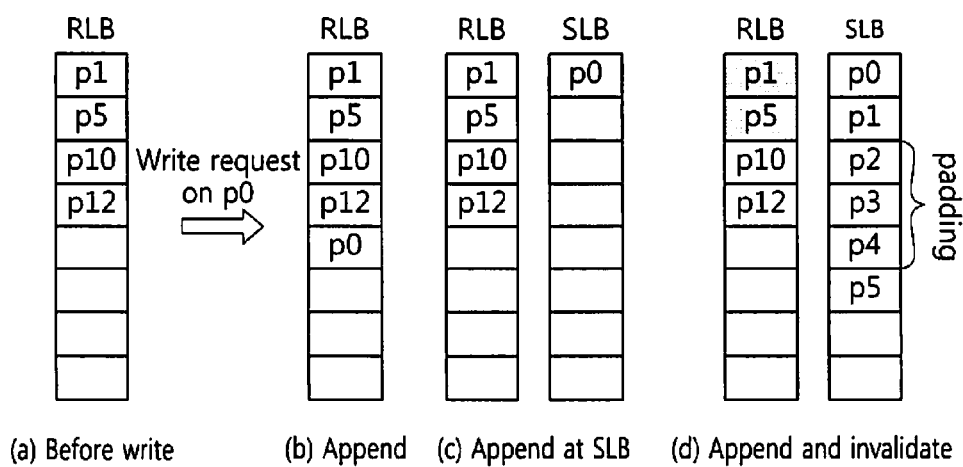
FIG. 11B shows a procedure for writing data in order not to increase the associativity of a log block according to an exemplary embodiment of the present invention.

FIG. 11B shows a procedure for writing data in order not to increase the associativity of the log block according to the exemplary embodiment of the present invention.

Referring to FIG. 11B, if a write request for a page p0 is input to a random log block allocated as in a part (a) of FIG. 11b, a first optional method is to append and write the page p0 to the first free page of the random log block without using the sequential log block, as shown in a part (b) of FIG. 11B.

Also, if a write request for a page p0 is input to a random log block allocated as in a part (a) of FIG. 11B, a second optional method is to allocate a sequential log block and to append and write a page p0 to the sequential log block, as shown in a part (c) of FIG. 11B, or to copy pages on which an update is not requested to the sequential log block from the data block to pad the sequential log block in order to maintain the sequentiality of the sequential log block, as shown in a part (d) of FIG. 11B.

Figure 11C:
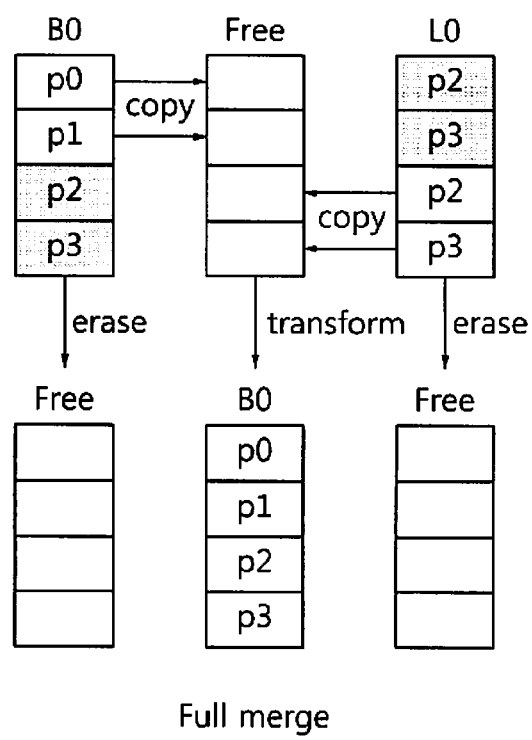
FIG. 11C is a schematic diagram illustrating a full merge operation according to an exemplary embodiment of the present invention.
Figure 11D:
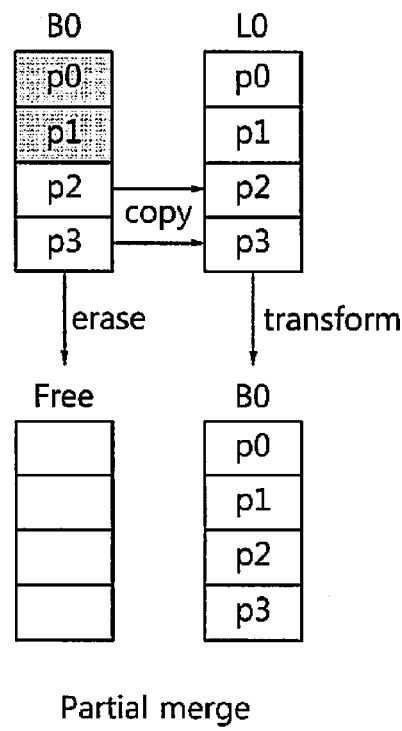
FIG. 11D is a schematic diagram illustrating a partial merge operation according to an exemplary embodiment of the present invention.
Figure 11E:
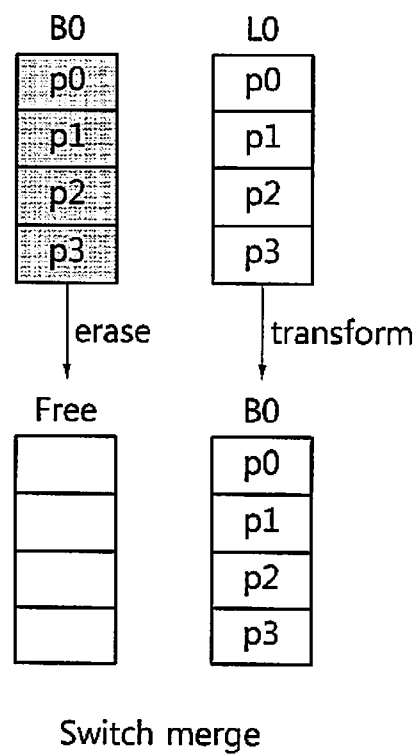
FIG. 11E is a schematic diagram illustrating a switch merge operation according to an exemplary embodiment of the present invention.

FIG. 11C is a schematic diagram illustrating the full merge, FIG. 11D is a schematic diagram illustrating the partial merge, and FIG. 11E is a schematic diagram illustrating the switch merge. Only the full merge is possible in the random log block, and all of the full merge, the partial merge and the switch merge are possible in the sequential log block.

Referring to FIG. 11C, if there are invalidated data (pages p2 and p3), the full merge is performed such that valid data (pages p0 and p1) in a data block B0 are copied to a free block, valid data (pages p2 and p3) in a log block L0 are copied to the free block, and then the data block B0 and the log block L0 are erased. In case of the full merge, twice erase operations and four times copy operations are performed.

Referring to FIG. 11D, if there are invalidated data (pages p0 and p1), the partial merge is performed such that valid data (pages p2 and p3) in a data block B0 are copied to a log block L0, the data block B0 is erased, and the log block L0 is transformed to a data block B0. In case of the partial merge, one time erase operation and twice copy operations are performed.

Referring to FIG. 11E, if there is no free page in a log block, the switch merge is performed. Pages p0, p1, p2, and p3 in a data block B0 are invalid data, and the switch merge is performed such that the data block B0 is erased, and a log block L0 is transformed to a data block B0. In case of the switch merge, only the erase operation is performed, and thus an overhead resulting from the copy operation does not occur since the copy operation is not performed.

FIGS. 11F to 11I are schematic diagrams illustrating a data writing procedure for increasing the associativity of the log block according to the exemplary embodiment of the present invention. There are six data blocks and four log blocks. It is assumed that data is written in all of data blocks, and the log blocks are empty.

Figure 11F:
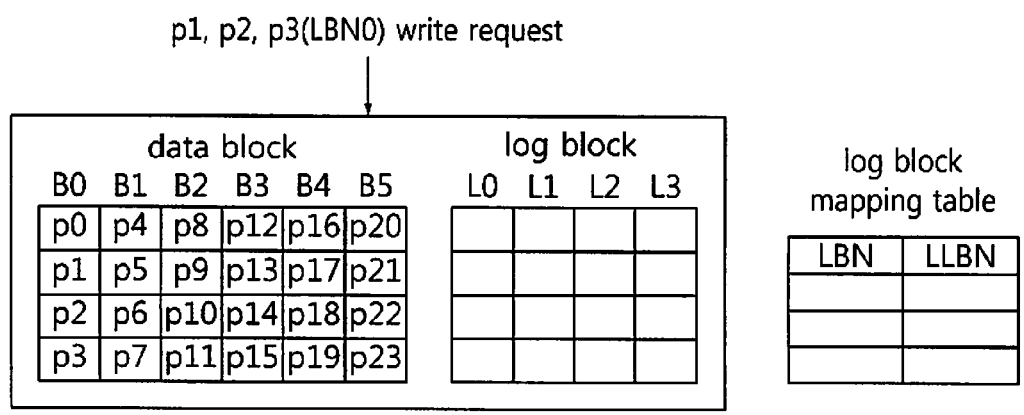
Figure 11H:
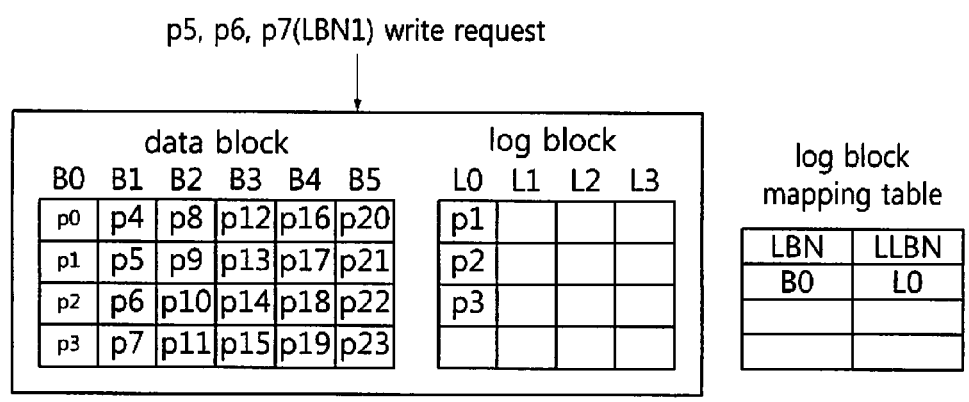

As shown in FIG. 11F, if an update request on pages p1, p2, and p3 in a data block B0 (LBN 0) is generated, it is checked whether there is a log block associated with the LBN 0 or not by checking the log block mapping table. If the associated log block does not exist, data writing for increasing the associativity of the log block is attempted.

Since there is no log block that the switch merge is possible, it is checked whether a free log block exists or not. Since the free log block exists, a first log block L0 is selected to write the page p1, and an association between the LBN and the LLBN is written in the log block mapping table. Then, if an update request on the pages p2 and p3 is generated, the pages p2 and p3 are written in the log block L0 associated with the LBN 0 by checking the log block mapping table.

Thereafter, if a write request on pages p5, p6 and p7 (LBN 1) is generated, a log block L1 is selected to write data, and the log block mapping table is updated, in the same way as the above-described procedure.

That is, data in the data blocks having different logical block numbers LBNs are written in different log blocks.

FIGS. 12A to 12C are schematic diagrams illustrating a data update procedure of the method for distributing the log block associativity in the log buffer-based FTL according to the exemplary embodiment of the present invention as a first scenario.

In the method for distributing the log block associativity in the log buffer-based FTL according to the exemplary embodiment of the present invention, data on which an update is requested is sequentially written in a log block to distribute the associativity of the log block.

In case of a scenario of FIGS. 12A to 12C, it is assumed that a page update request is generated in an order of p1, p5, p9, p13, p17, p20, p21, p2, and p6.

First, if an update request on pages p1, p5, p9, and p13 is generated, in the method (KAST) for distributing the log block associativity in the log buffer-based FTL according to the exemplary embodiment of the present invention, data is written in all log blocks which are currently available to increase the associativity by 1, unlike the FAST log block mapping technique. Therefore, the associativity of all log blocks becomes "1", so that the associativity of the log block is distributed (see FIG. 12A). If data is written in the log block, association information between a corresponding data block and a corresponding log block is stored in the log block mapping table.

Then, if an update request on a page p17 is generated, data is appended to a log block L0, so that the associativity of the log block L0 is increased. At this time, a log block which has most free pages among log blocks having a minimum associativity is selected, starting from the first log block, and data is written in the selected log block, and the most recently updated log block is L0 as shown in FIG. 12B.

If an update request on a page p20 is generated, since the page p20 is data having an offset of 0, data is written in the sequential log block. Currently, since all of four log blocks are allocated and are used as a random log block, one of the log blocks is selected and merged to allocate a sequential log block. The log block which becomes a target of the merge operation may be a least recently updated (LRU) log block among the log blocks having a minimum associativity. Therefore, as shown in FIG. 12C, the log block L1 is selected and is merged, and then pages p20 and p21 are written in the log block L1.

The method (KAST) for distributing the log block associativity in the log buffer-based FTL according to the exemplary embodiment of the present invention performs a write operation to maintain a minimum associativity of the log block. Therefore, if an update on a page 2 is requested, as shown in FIG. 12C, data is written in the log block L0 not to increase the associativity of the log block.

Here, the log block L0 in which the pages p1 and p17 are written has the log block associativity of 2. Even though the page p2 is additionally written in the log block L0 in which the pages p1 and p17 are already written, the log block associativity of 2 is maintained "as is", so that the associativity of the log block is not increased.

Finally, if an update request on a page 6 is generated, the page p6 is written in the log block having a minimum associativity among the random log blocks, and thus as shown in FIG. 12C, the page p6 is written in the log block L2, and the associativity is increased by 1. A final associativity for each log block is shown in Table 1.

TABLE 1

| | Log block | | | |
|---|---|---|---|---|
| | L0 | L1 | L2 | L3 |
| Kind of log block | Random log block | Sequential log block | Random log block | Random log block |
| Associativity | 2 | 1 | 2 | 1 |

FIGS. 13A to 13C are schematic diagrams illustrating a procedure for writing data into a log block according to the exemplary embodiment of the present invention as a second scenario.

In case of a scenario of FIGS. 13A to 13C, it is assumed that six data blocks B0 to B5 and four log blocks L0 to L3 exist, one block includes eight pages, data are written in all of data block, all write requests are a data update request, and a maximum associativity K of the log block and the maximum number of sequential log blocks which can be maintained are 2, respectively. It is also assumed that a page write request is generated in an order of p1, p9, p17, p25, p32, p33, p34, p40, p41, p2, p10, and p3.

First, if a data write request on pages p1, p9, p17, and p25 is generated, since a log block which is allocated until now does not exist in the log block mapping table, as shown in FIG. 13A, data are sequentially written in four log blocks, and association information between the data block and the log block is written in the log block mapping table. At this time, all of log blocks are a random log block and have the associativity of 1.

Then, if a write request on a page p32 is generated, a sequential log block is allocated since an offset of a data block B4 is 0. However, since all of log blocks are currently allocated, one of the log blocks is merged. In the method (KAST) for distributing the log block associativity in the log buffer-based FTL according to the exemplary embodiment of the present invention, the least recently updated (LRU) log block L0 among the log blocks having a minimum associativity is selected to be merged. Therefore, as shown in FIG. 13B, the log block L0 is merged, and the page 32 is written in the log block L0, so that the log block L0 is used as the sequential log block.

Then, pages p33 and p34 are written in the sequential log block L0 in order to maintain the sequentiality as shown in FIG. 13B since the pages p33 and p34 are data subsequent to the page p32.

If an update request on a page p40 is generated, the page p40 is written in the sequential log block since the page p40 has an offset of 0 in the data block B5. Since maximum two sequential log blocks can be maintained, the log block L1 is merged, and then as shown in FIG. 13B, the page p40 is written in the log block L1, so that the log block L1 is used as the sequential log block. Therefore, total two sequential log blocks L0 and L1 have been used until now.

Subsequently, a page p41 is written in the sequential log block L1 as shown in FIG. 13B since the page p41 is data subsequent to the page p40.

Then, if an update request on a page p3 is generated, since it is assumed that the maximum associativity of the log block is restricted to 2, the log block L2 is full-merged, and then, as shown in FIG. 13C, the page p3 is written at a first offset of the log block L2.

FIGS. 14A to 14D are schematic diagrams illustrating a procedure for writing data into a sequential log block according to the exemplary embodiment of the present invention in a second scenario.

In FIG. 13C, the log blocks L0 and L1 are used as a sequential log block. Here, it is assumed that the sequential log block L0 is written as shown in a left side of FIG. 14A.

Figure 14A:
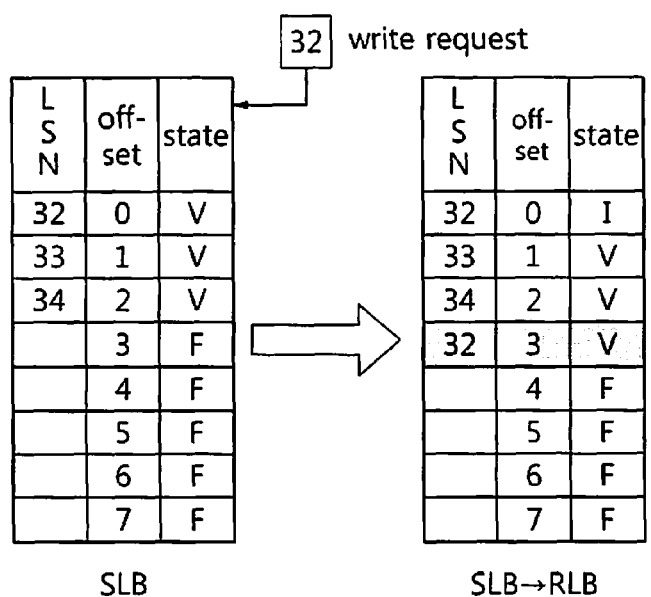
FIGS. 14A to 14D are schematic diagrams illustrating a procedure for writing data into a sequential log block according to an exemplary embodiment of the present invention in a second scenario.

If a write request on a page 32 is generated, an offset$_{last}$ of a page written last and an offset$_{cur}$ of a page that an update request is currently generated are compared. Since the offset$_{last}$ is larger than the offset$_{cur}$ and the number (5) of free pages in the log block Lo is larger than a predetermined number, as shown in FIG. 14A, the page 32 is written at the last offset of the log block L0, and the sequential log block is transformed to a random log block.

Figure 14B:
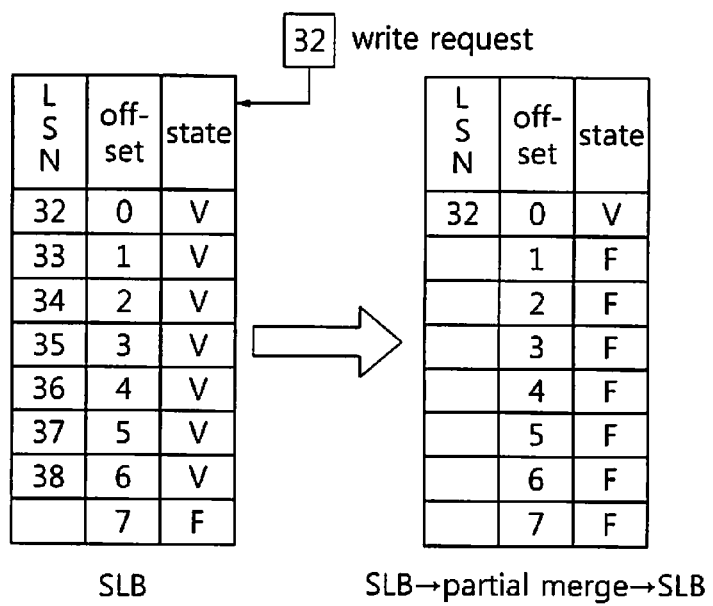

However, as shown in FIG. 14B, if the number of free pages in the log block L0 is smaller than a predetermined number, the partial merge is performed, the page 32 is then written in a first page of the partial-merged log block L0, so that the log block L0 is used as a sequential log block.

Figure 14C:
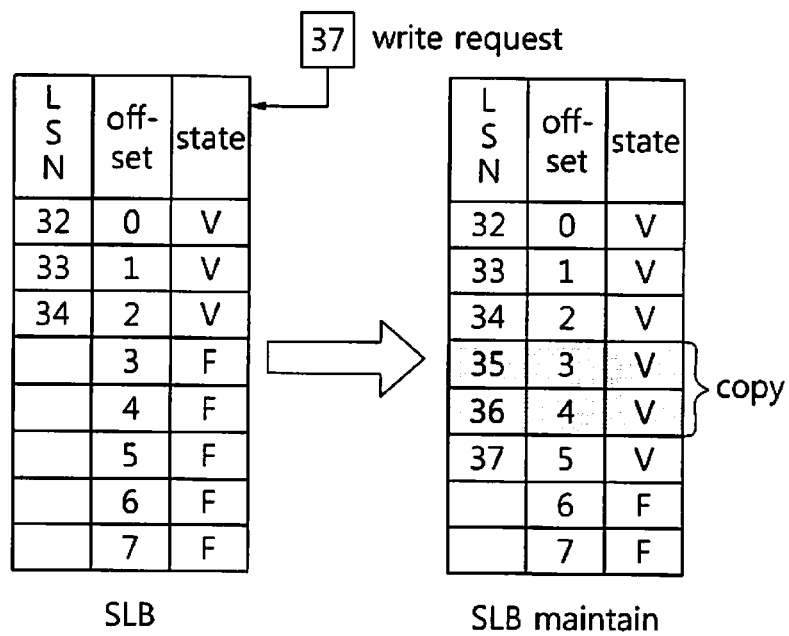

Thereafter, as shown in FIG. 14C, if a write request of data p37 that the offset$_{cur}$ is larger than the offset$_{last}$ is generated, a difference value between the offset$_{cur}$ and the offset$_{last}$ is obtained. If the difference value is smaller than a predetermined gap, as shown in FIG. 14C, intermediate data p35 and p36 are copied to the sequential log block from the data block, and the sequential log block is maintained.

Figure 14D:
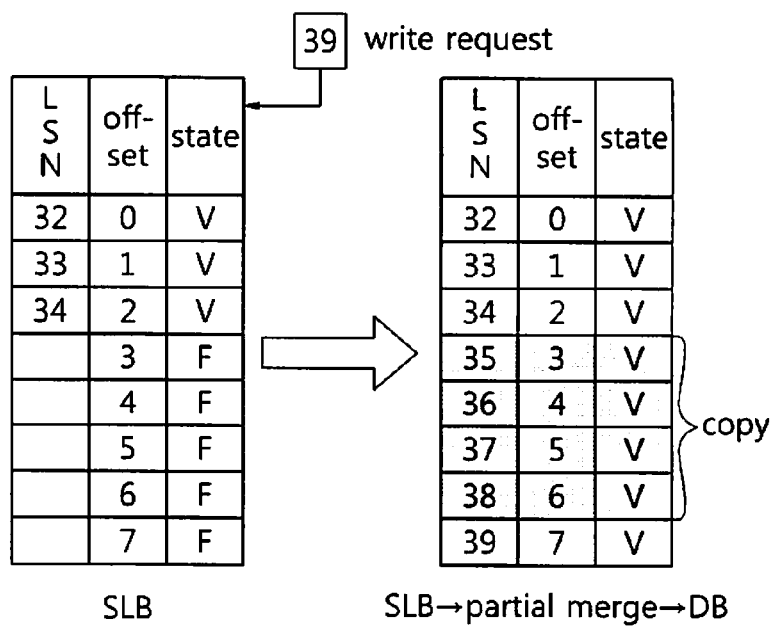

If a write request of data p39 that the offset$_{cur}$ is larger than the offset$_{last}$ is generated, a difference value between the offset$_{cur}$ and the offset$_{last}$ is obtained. If the difference value is larger than a predetermined gap, as shown in FIG. 14D, the log block is partial-merged to be used as a data block.

A simulation was performed to evaluate a performance of the method for distributing the log block associativity in the log buffer-based FTL according to the exemplary embodiment of the present invention. In the simulation, two kinds of I/O workloads were used for evaluation. One is a storage I/O trace which is extracted while executing a web browser which generates a plurality of small random access files, and the other is an I/O result (trace) which is collected while executing a plurality of application programs such as documents editors, music players, web browsers and games in a Microsoft Windows XP-based desktop PC. The traces have both sequential access and random access. Here, a single level cell (SLC) NAND flash memory model that one block includes 64 pages was used, and times for a page read operation, a page program operation and a block erase operation were about 25 μs, about 200 μs and about 2 ms, respectively.

Figure 15A:
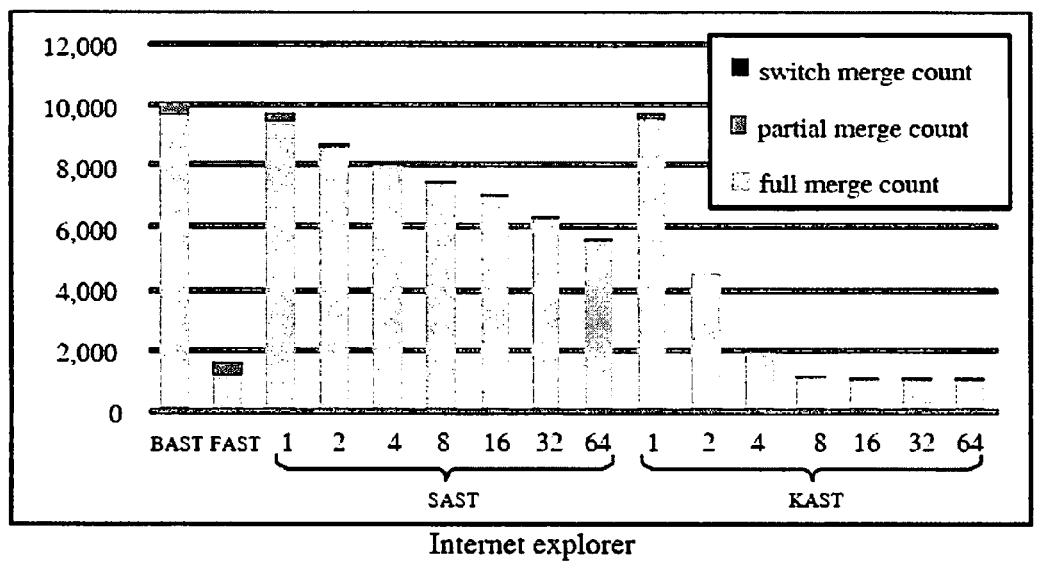
FIGS. 15A and 15B are graphs illustrating the number of times that a log block merge is performed when a hybrid-level mapping technique is applied to several techniques using a FTL.
Figure 15B:
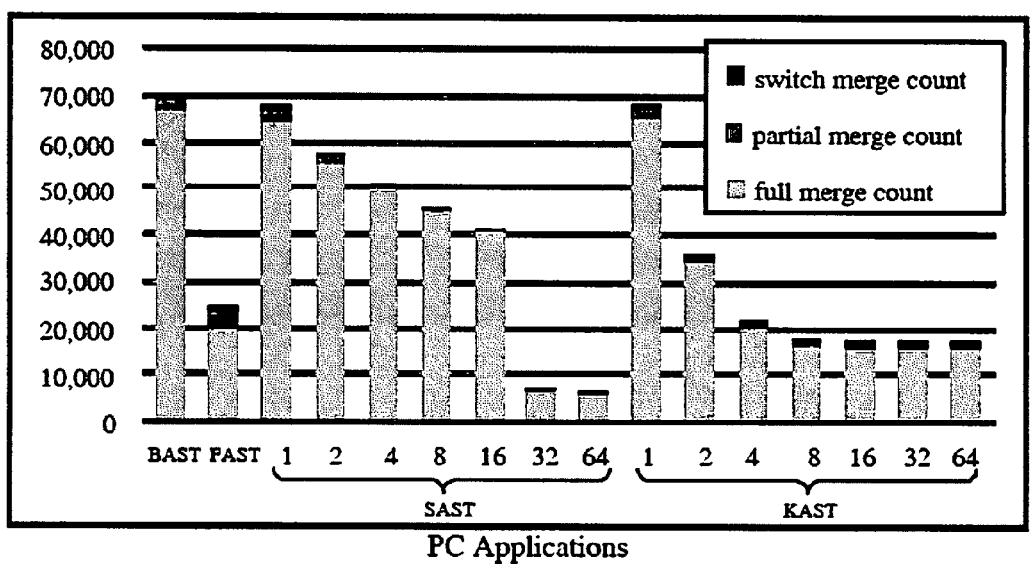

FIGS. 15A and 15B are graphs illustrating the number of times that a log block merge is performed when a hybrid-level mapping technique is applied to several techniques using a FTL. Here, in all experiments, the number of log blocks was 32. In case of the SAST technique and the KAST technique (the method for distributing the log block associativity in the log buffer-based FTL according to the exemplary embodiment of the present invention), experiments were performed, varying a value of K (a maximum value of the block associativity of the log block). In case of the SAST technique, the size of a log block set was constantly set to K. It can be seen that in the FAST technique, the block merges of the smallest number of times are performed, and in the BAST technique, the block merges of the significant number of times are performed due to a log block thrashing problem. When k=1, the SAST technique and the KAST technique are almost same in the number of times of the block merge. However, as K increases, the number of times of the log block merge of the SAST and KAST techniques is decreased. When K≧8, the KAST technique is smaller in the number of times of the log block merge than the FAST technique, and in case of most of K values, the SAST technique is larger in the number of times of the log block merge than the FAST technique. It is because the SAST technique cannot avoid the log block thrashing problem.

Figure 16A:
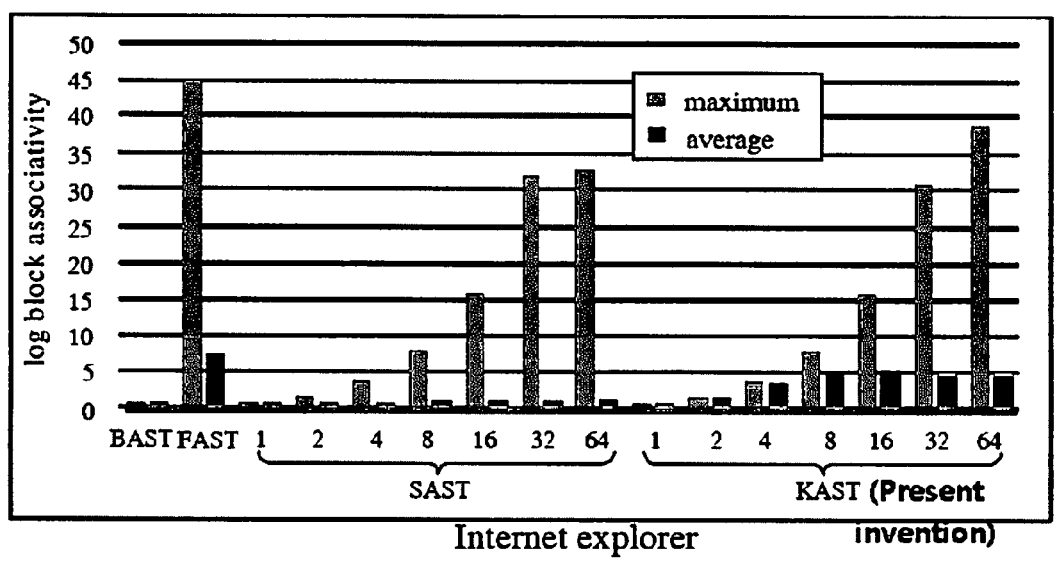
FIGS. 16A and 16B are graphs illustrating the block associativity of a log block when a log block is merged.
Figure 16B:
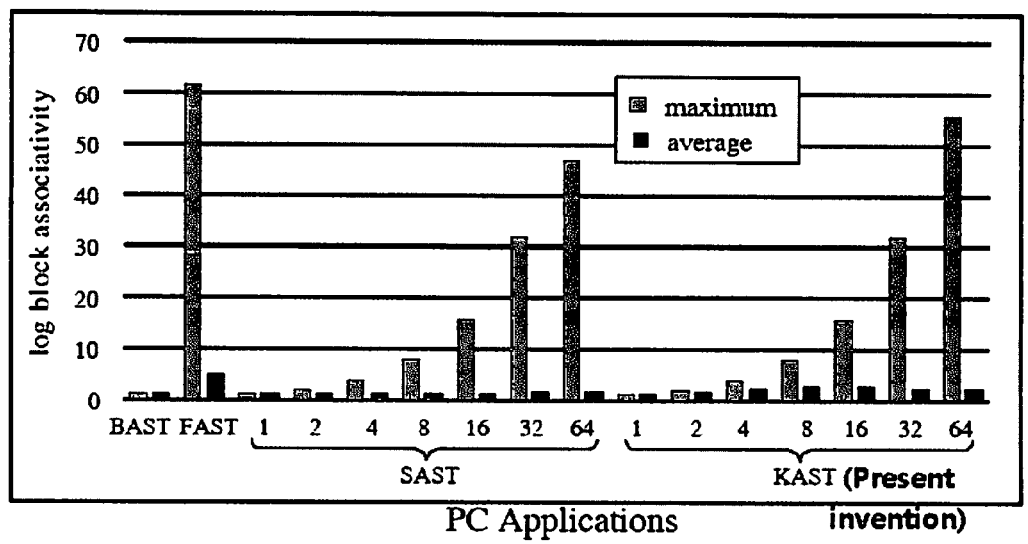

FIGS. 16A and 16B are graphs illustrating the block associativity of the log block when a log block is merged. The worst-case block merge cost depends on a maximum associativity value of a log block. From the results, it can be seen that the SAST and KAST techniques guarantee that the maximum associativity value is smaller than K. The maximum associativity value of the FAST technique is significantly high, and thus the FAST technique can invoke a long blocking time. However, in the SAST and KAST technique, the blocking time can be controlled by setting a value of K. The KAST technique is superior to the BAST and SAST technique in terms of the number of times of the block merge and is superior to the FAST technique in terms of the cost per log block merge (block associativity of the log block).

Figure 17:
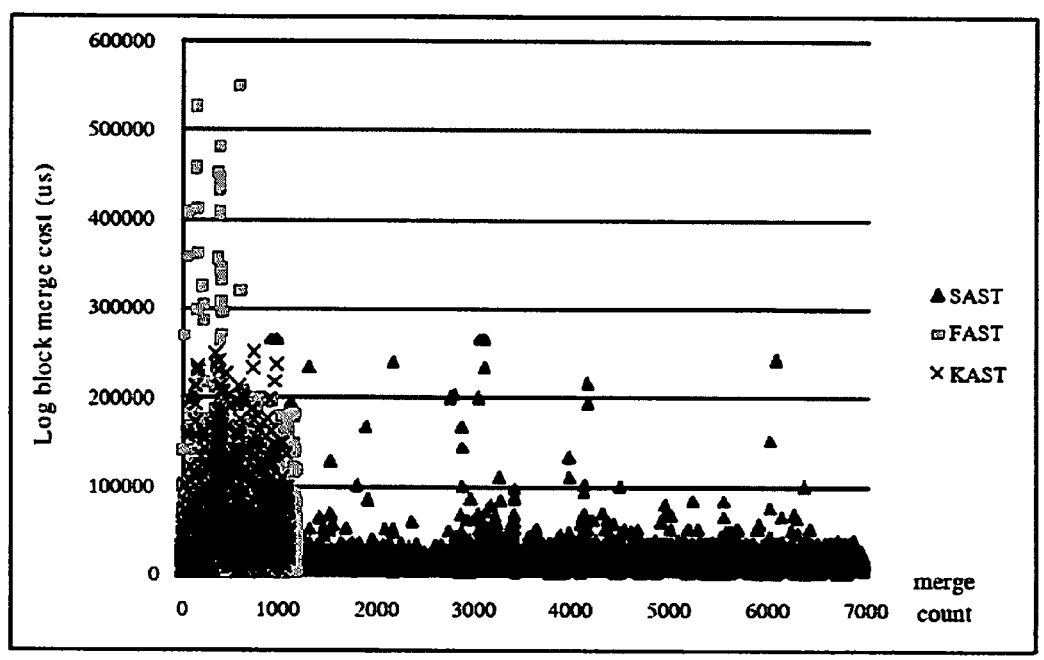
FIG. 17 shows blocking times in respective log block merges.

FIG. 17 shows the blocking times in respective log block merges. The I/O trace is that of the Internet explorer, and a K value is 16 in the KAST and SAST techniques. The worst-case blocking time of the FAST technique was 548 ms, and the KAST technique required the blocking time of about 232 ms. The blocking time of the SAST technique is generally smaller than that of the KAST technique because in the SAST technique, the log block is merged before filled with data. Therefore, it can be seen that the SAST technique invokes a significant large number of log block merges.

Figure 18A:
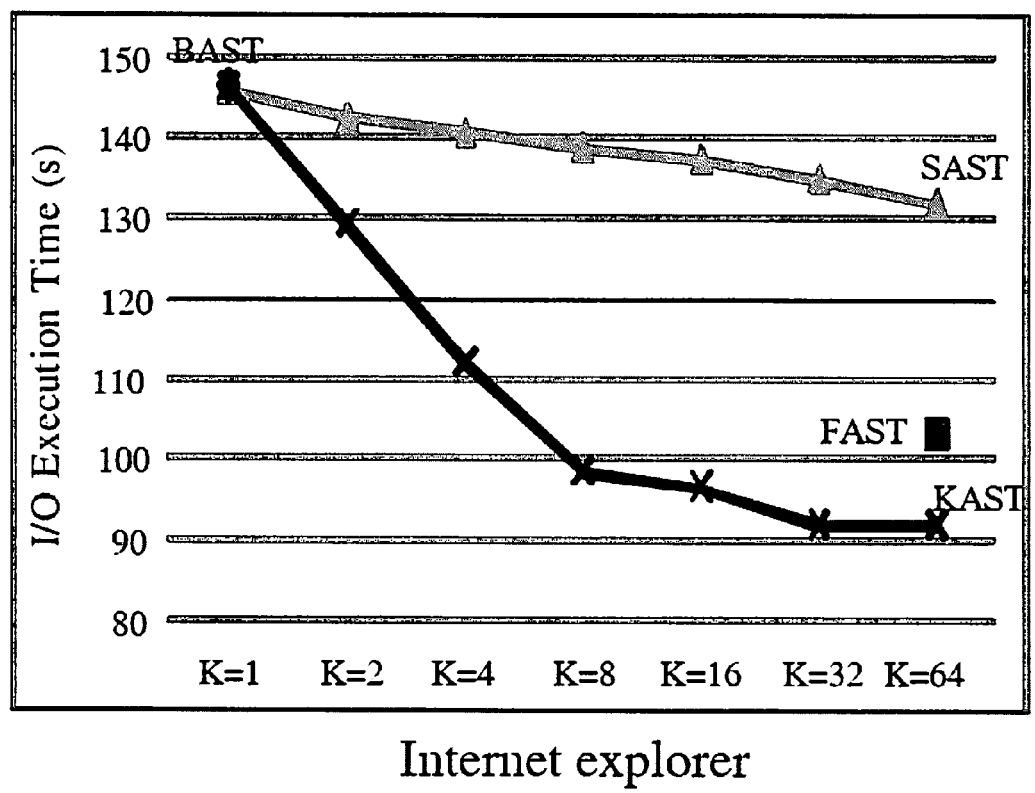
FIGS. 18A and 18B are graphs illustrating a total I/O execution time when a hybrid-level mapping is applied to several techniques using a FTL.
Figure 18B:
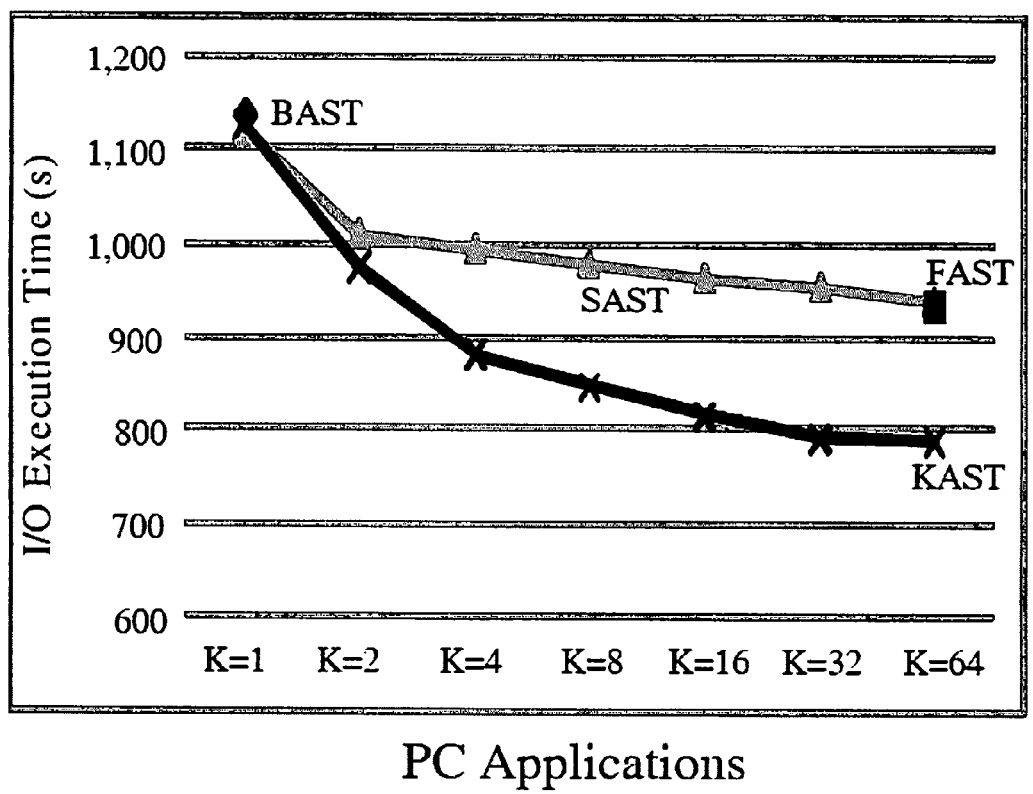

FIGS. 18A and 18B are graphs illustrating a total I/O execution time when a hybrid-level mapping is applied to several techniques using a FTL. The execution times of the SAST and FAST techniques decrease as a value of K increases since the number of times of the log block merge decreases. However, the SAST technique, which cannot avoid the log block thrashing problem, shows a worse result than the FAST technique with respect to the Internet explorer which has a random access pattern. However, the KAST technique outperforms both the SAST and FAST techniques when K≧8.

As described above, according to the exemplary embodiment of the present invention, the method for distributing the log block associativity in the log buffer-based FTL distributes the associativity of the log block and sets and restricts the log block associativity K to a predetermined value in advance.

Therefore, a maximum value of a time taken in performing a single merge operation can be estimated, and a maximum value of the worst-case merge cost can be estimated. Particularly, the cost of an erase operation among read, write and erase operations is highest, but an erase operation cost can be restricted, and a maximum delay time occurring when a flash memory is employed in a real-time system which has to guarantee that an operation is completed within a fixed time can be restricted, whereby non-fluctuating stable performance can be provided, maximizing flash memory use efficiency.

The whole merge cost occurring by a merge operation can be reduced.

The method and flash memory for distributing the log block associativity in the log buffer-based FTL may be applied to a solid state drive (SSD). While the example embodiments of the present invention and their advantages have been described in detail, it should be understood that various changes, substitutions and alterations may be made herein without departing from the scope of the invention.

What is claimed is:

1. A method for distributing a log block associativity in a log buffer-based flash translation layer (FTL) of a flash memory with physical blocks which include a plurality of data blocks which are identified by different logical block numbers and a plurality of log blocks which are identified by different logical log block numbers, the method comprising:

if a write request to write a page p into a log block is generated, checking whether a log block associated with a corresponding data block that the write request is generated exists or not by checking a log block mapping table which stores mapping information between the data blocks and the log blocks, where the associativity of each of the plurality of log blocks to a data block is set to equal to or less than a predetermined value K in advance, and K is a natural number;

if a log block associated with a corresponding data block that the write request is generated exists, checking whether the associated log block is a random log block or a sequential log block;

if the associated log block is a random log block, writing data that the write request is generated in a first free page of the random log block, wherein the plurality of data blocks and the plurality of log blocks are not grouped, and the sequential log block can be transformed into the random log block; and if a log block associated with a corresponding data block that the write request is generated does not exist, writing data that the write request is generated to increase the associativity of a log block to a data block, wherein the writing data that the write request is generated to increase the associativity of a log block to a data block includes if a log block that a switch merge is possible exists, writing data that the write request is generated in a new log block after performing a switch merge, if a log block that a switch merge is possible does not exist and a free log block exists, writing data that the write request is generated in an available free log block, if the switch merge is impossible and all log blocks are associated with at least one data block, determining whether the associativity of a currently allocated log block reaches the predetermined value K or not or an offset of data that the write request is currently generated is 0 or not, and if the associativity of a currently allocated log block does not reach the predetermined value K or an offset of data that the write request is currently generated is not 0, selecting a log block which has most free pages among log blocks having a minimum associativity to write data that the write request is generated.

2. The method of claim 1, wherein the writing data that the write request is generated to increase the associativity of a log block to a data block comprises distributing the log block associativity to maintain the log block associativity at minimum by writing data of data blocks having the same logical block number in the same log block and writing data of data blocks having different logical block numbers in different log blocks.

3. The method of claim 1, further comprising, if the associated log block is a sequential log block, checking whether the sequentiality of the associated sequential log block can be maintained or not;

if the sequentiality of the associated sequential log block can be maintained, writing data that the write request is generated in a first free page of the associated sequential log block;

if the sequentiality of the associated sequential log block cannot be maintained, checking the number of free pages of the associated sequential log block when the amplitude of a first offset of a last page currently written in the associated sequential log block is equal to or larger than the amplitude of a second offset of data that the write request is generated; and if the number of free pages is larger than a predetermined value, transforming the associated sequential log block to a random log block after writing data that the write request is generated in the associated sequential log block.

4. The method of claim 3, further comprising, if the sequentiality of the associated log block cannot be maintained, writing data that the write request is generated in the associated sequential log block to maintain the sequential log block after copying data between intermediate offsets to the associated sequential log block when the amplitude of the first offset is smaller than the amplitude of the second offset and a gap between the first and second offsets is not larger than a predetermined gap.

5. The method of claim 3, wherein the maximum number of sequential log blocks is variable, and the maximum number of sequential log blocks is equal to or more than 1.

6. A flash memory device, comprising:

a flash memory which includes a plurality of blocks each of which includes a plurality of pages; and a flash translation layer (FTL) which maps a logical address transmitted from a file system with a physical address of the flash memory using an address translation mapping table, wherein the FTL identifies a plurality of data blocks using different logical block numbers and a plurality of log blocks using different logical log block numbers, and the FTL performs if a write request to write a page p in a log block is generated, checking whether a log block associated with a corresponding data block that the write request is generated exists or not by checking a log block mapping table which stores mapping information between the data blocks and the log blocks, where the associativity of each of the plurality of log blocks to a data block is set to equal to or less than a predetermined value K in advance, and K is a natural number;

if a log block associated with a corresponding data block that the write request is generated exists, checking whether the associated log block is a random log block or a sequential log block; and if the associated log block is a random log block, writing data that the write request is generated in a first free page of the random log block, wherein the plurality of data blocks and the plurality of log blocks are not grouped, and the sequential log block can be transformed into the random log block, wherein the FTL further performs if the associated log block is a sequential log block, checking whether the sequentiality of the associated sequential log block can be maintained or not, if the sequentiality of the associated sequential log block can be maintained, writing data that the write request is generated in a first free page of the associated sequential log block, if the sequentiality of the associated sequential log block cannot be maintained, checking the number of free pages of the associated sequential log block when the amplitude of a first offset of a last page currently written in the associated sequential log block is equal to or larger than the amplitude of a second offset of data that the write request is generated, and if the number of free pages is larger than a predetermined value, transforming the associated sequential log block to a random log block after writing data that the write request is generated in the associated sequential log block.

7. The flash memory device of claim 6, wherein the FTL further performs, if the sequentiality of the associated log block cannot be maintained, writing data that the write request is generated in the associated sequential log block to maintain the sequential log block after copying data between intermediate offsets to the associated sequential log block when the amplitude of the first offset is smaller than the amplitude of the second offset and a gap between the first and second offsets is not larger than a predetermined gap.

8. The flash memory device of claim 6, wherein the maximum number of sequential log blocks is variable, and the maximum number of sequential log blocks is equal to or more than 1.

* * * * *